(12) United States Patent
Samuel

(10) Patent No.: US 7,521,400 B2
(45) Date of Patent: *Apr. 21, 2009

(54) GELLED OIL WITH SURFACTANT

(75) Inventor: Mathew Samuel, Kuala Lumpur (MY)

(73) Assignee: Schlumberger Technology Corporation, Sugar Land, TX (US)

( * ) Notice: Subject to any disclaimer, the term of this patent is extended or adjusted under 35 U.S.C. 154(b) by 437 days.

This patent is subject to a terminal disclaimer.

(21) Appl. No.: 11/064,332

(22) Filed: Feb. 22, 2005

(65) Prior Publication Data

US 2005/0233911 A1 Oct. 20, 2005

Related U.S. Application Data

(60) Provisional application No. 60/563,206, filed on Apr. 16, 2004.

(51) Int. Cl.
*C09J 8/64* (2006.01)
*E21B 43/26* (2006.01)
*B01F 3/12* (2006.01)

(52) U.S. Cl. .......... 507/240; 166/308.4; 166/308.6; 166/308.2; 507/239; 507/203; 516/31

(58) Field of Classification Search ........ 507/240, 507/239, 203; 166/308.4, 308.6, 308.2, 308.1
See application file for complete search history.

(56) References Cited

U.S. PATENT DOCUMENTS

| | | | | |
|---|---|---|---|---|
| 2,966,401 A * | 12/1960 | Myerholtz, Jr. | ........... | 44/268 |
| 3,757,864 A | 9/1973 | Crawford et al. | ........... | 166/308 |
| 4,507,213 A | 3/1985 | Daccord et al. | ........... | 252/8.55 |
| 4,622,155 A | 11/1986 | Harris et al. | ........... | 252/8.551 |
| 4,647,480 A * | 3/1987 | Ahmed | ........... | 427/341 |
| 4,877,894 A * | 10/1989 | Huddleston | ........... | 558/113 |
| 5,110,485 A | 5/1992 | Huddleston | ........... | 252/8.551 |
| 5,190,675 A | 3/1993 | Gross | ........... | 252/8.551 |
| 5,964,295 A | 10/1999 | Brown et al. | ........... | 166/308 |
| 6,184,184 B1 * | 2/2001 | Amin et al. | ........... | 507/238 |
| 6,248,699 B1 * | 6/2001 | Subramanian et al. | ........... | 507/265 |
| 6,258,859 B1 | 7/2001 | Dahayanake et al. | ........... | 516/77 |
| 2003/0119680 A1 * | 6/2003 | Chang et al. | ........... | 507/200 |
| 2003/0236174 A1 * | 12/2003 | Fu et al. | ........... | 507/200 |

OTHER PUBLICATIONS

SPE 7564—Developments in Hydrocarbon Fluids for High-Temperature Fracturing by, Feb. 1980.
SPE 9007—Hydrocarbon Gels of Alumino Alkyl Acid Orthophosphates by lee F. Mckenzie and B.J. Hughes, 1980.
SPE 21586—Continuously Gelled Diesel Systems for Fracturing Applications by M.A. McCabe, J. M. Terracina and R.A. Kunzi, Jun. 10-13, 1980.
SPE 21859—An Improved Gelled Oil System for High-Temperature Fracturing Applications, by D.D. Cramer, J. Dawson, and M. Ouabdesselam, Apr. 15-17, 1991.
SPE 38622—Polymer-Free Fluid for Hydraulic Fracturing, by Mathew Samuel, Roger J. Card, Erik B. Nelson, J. Ernest brown, P.S. Vinod, Harry Temple, Qi Qu and Dan K. Fu, 1997.
Association Colloids in Nonaqueous Fluids- Viscosity and Drag Reduction Characteristics, by Hayward R. Baker, Robert N. Bolster, Paul B. Leach and Ralph C. Little, 1970.

* cited by examiner

*Primary Examiner*—Timothy J Kugel
(74) *Attorney, Agent, or Firm*—David Cate; Robin Nava; Dale Gaudier

(57) ABSTRACT

A viscoelastic gelled oil, for example gelled diesel or paraffin oil, is made with a gelling agent, for example a phosphate ester, a metal carboxylate, for example an aluminum carboxylate, and a gel-enhancing surfactant, for example a zwitterionic surfactant, for example erucylamidopropyl betaine. The gel-enhancing surfactant makes the gel viscoelastic, increases the stability and decreases the sensitivity to the concentrations of the gelling agent and the metal carboxylate. The enhanced viscoelastic gelled oils are used, as examples, in hydraulic fracturing, frac packing, gravel packing, diversion, fluid loss control, lost circulation control, sand control, wellbore cleanout, wellbore or pipeline sweeping, organic scale dissolution, organic scale removal, and drilling.

13 Claims, 23 Drawing Sheets

GELLED OIL WITH SURFACTANT

CROSS-REFERENCE TO RELATED APPLICATIONS

This application claims the benefit of U.S. Provisional Patent Application No. 60/563,206, filed on Apr. 16, 2004.

TECHNICAL FIELD OF THE INVENTION

The invention relates to gelled oils used in treating water-sensitive subterranean formations. More particularly, it relates to gelled oils used in fracturing, sand control, frac packing, pipe cleanup, diversion, coiled tubing cleanout and other well services in the oilfield. Most particularly, it relates to a method of improving the properties of gelled oils by addition of gel-enhancing surfactants.

BACKGROUND OF THE INVENTION

Water-based treatment fluids can damage some formations for several reasons including clay swelling, emulsion/water block, wettability alteration and relative permeability effects. Hydrocarbon-based fluids are perceived as less damaging to hydrocarbon-bearing formations than water-based fluids. Because of several handling limitations, lack of temperature stability, cost, dependence of base hydrocarbon source and nature on gellation properties, they are not often the primary choice. However, they are used in formations that are known to be extremely water sensitive.

In the 1960s, aluminum salts of carboxylic acids (for example, aluminum octoate) were used to raise the viscosity of hydrocarbon-based fluids (Burnham, J. W., Harris, L. E. and McDaniel, B. W.: "*Developments in Hydrocarbon Fluids for High-Temperature Fracturing*," paper SPE 7564, presented at the SPE Annual Technical Conference and Exhibition, Houston, Tex., USA (Oct. 1-3, 1978); also in *Journal of Petroleum Technology* (February, 1980) 32, No. Z 217-220). This improved the temperature stability and solids-carrying capability of the fluids and the technology was recommended for hydraulic fracturing applications. In the 1970s, aluminum carboxylate salts were replaced by aluminum phosphate ester salts. This helped in increasing the temperature range in which this oil-based fluid could be used and also enhanced the proppant transport ability of the system. Today, aluminum phosphate ester chemistry remains the preferred method of gelling hydrocarbons for fracturing purposes. Both methods of thickening oil rely on an "associative" mechanism (Baker, H. R., Bolster, R. N., Leach, P. B. and Little, R. C.: "*Association Colloids in Nonaqueous Fluids,*" *Ind. Eng. Chem., Prod. Res. Develop.* (1970) 9, No. 4, 541-54.). It is believed that the interactions between the aluminum complexes and phosphate ester molecules in these prior art fluids produce a long polymer chain as shown in FIG. 1A (Burnham et al., 1980).

The R groups shown in FIG. 1A are hydrocarbon chains and are soluble in the oil to be gelled. These soluble R groups keep the aluminum phosphate ester polymer in solution. Generally, the R groups are hydrocarbon chains containing up to 18 carbon atoms (Crawford, D. L., Earl, R. B. and Monroe, R. F.: "*Friction Reducing and Gelling Agent for Organic Liquids,*" U.S. Pat. No. 3,757,864 (Sep. 11, 1973). The R groups have a high affinity for oils such as kerosene and diesel that comprise 12- to 18-carbon (and somewhat higher) chains. Crude oils are composed of a larger number of different organic compounds and may contain paraffins and asphaltenes. Some high-molecular weight compounds, especially paraffins and asphaltenes, are not compatible with the aluminum phosphate ester gelling system. Many crude oils may be gelled, but testing them prior to use in the field is highly recommended.

The R groups can be pictured as forming an oil compatible shield around the polar core of aluminum ions (McKenzie, L. F. and Hughes, B. J: "*Hydrocarbon Gels of Alumino Alkyl Acid Orthophosphates,*" paper SPE 9007, presented at the 5th International Symposium on Oilfield and Geothermal Chemistry, Stanford, California, USA (May 28-30, 1980). Polar species (such as water, acids, bases or salts) are incorporated into the polar core and affect the association of the aluminum ions and phosphate ester groups. These materials can make the gel structure more rigid, or they can destroy the gel structure.

The viscosity of the standard aluminum phosphate ester gel is controlled by varying the quantities of aluminum compound and phosphate ester. To improve high-temperature performance, the viscosity of the gel can be increased by increasing the amount of polymer; however, this results in very high viscosities on the surface, which make it difficult to draw the fluid out of the tanks to the pumps. One approach used is to add part of the gelling materials "on the fly" so that high viscosity is not achieved until the fluid reaches the fracture (Harris, L. E., Holtmyer, M. D. and Pauls, R. W.: "*Method for Fracturing Subterranean Formations,*" U.S. Pat. No. 4,622,155 (Nov. 11, 1986); Cramer, D. D., Dawson, J and Ouabdesselam, M.: "*An Improved Gelled Oil System for High-Temperature Fracturing Applications,*" paper SPE 21859, presented at the Rocky Mountain Regional Meeting and Low Permeability Reservoirs Symposium, Denver, Colo., USA.). On-the-fly addition means that the materials are added to the fluid as the fluid is pumped downhole. Another approach is to maximize thermal stability by carefully controlling the composition of the solution to provide optimum conditions for association of the aluminum and phosphate ester species (Gross, J M: "Gelling Organic Liquids," U.S. Pat. No. 5,190,675 (Mar. 2, 1993).

Typically, these systems take a long time to gel once the chemicals are mixed together. Recent developments in gelled oil chemistry make a true continuous-mix (all materials added on the fly) gelled oil possible. By changing the aluminum source, the aluminum/phosphate ester ratio in the gel and/or the phosphate ester mix (Daccord, G., Lamanczyk, R. and Vercaemer, C: "Method for Obtaining Gelled Hydrocarbon Compositions According to Said Method and Their Application the Hydraulic Fracturing of Underground Formations," U.S. Pat. No. 4,507,213 (Mar. 26, 1985); McCabe, M. A., Terracina, J. M. and Kunzl, R. A.: "*Continuously Gelled Diesel Systems for Fracturing Applications,*" paper CIM/SPE 90-93, presented at the Petroleum Society of CIM/SPE International Technical Meeting, Calgary, Alberta, Canada (Jun. 10-13, 1990).; Huddleston, D A.: "*Liquid Aluminum Phosphate Salt Gelling Agent,*" U.S. Pat. No. 5,110,485 (May 5, 1992), a rapidly thickening gel composition can be achieved. With this chemistry, the aluminum source and phosphate ester can be added to the hydrocarbon as it is pumped downhole. The gel is formed on the way to the perforations. The expense of premixing the gel is eliminated, as well as the disposal problem if there is any unused gel.

Gelled oil systems are currently used primarily for fracturing and sand control applications. They are also used for coiled tubing (CT) cleanout applications, especially in water sensitive formations. Because of the low sand suspension capabilities of conventional gelled oils when pumping at high rates, foaming of the fluids is often recommended. However, gelled oils are difficult to foam, and often require fluorosurfactant compounds that are not environmental friendly. In addition, friction loss experienced with conventional gelled oil fluids is generally higher than that experienced with water based fluids, especially in turbulence. Some conventional gelled oils may tend to stick to tubing walls. In addition, the properties of conventional gelled oils are sensitive to the choice of the base oil and to the amounts of the aluminum complex and the phosphate ester.

There is a need for gelled oils that have increased viscosity and solids suspension capacity, less sensitivity to the concentration of components and to the nature of the base oil, and that are easy to foam.

SUMMARY OF THE INVENTION

One embodiment is a gelled fluid containing a non-aqueous base oil, a gelling agent, an activator, and a gel-enhancing surfactant in an amount sufficient to increase the viscosity of the fluid. The gelled fluid may be viscoelastic. The non-aqueous base oil may be, for example, diesel oil, mineral oil, crude oil, condensate, ether, paraffinic oil, frac oil, xylene, toluene, kerosene and mixtures thereof. The base oil may also be a special non-toxic and/or environmentally friendly material such as biodiesel or limonene. The gelling agent may be, for example, an organic carboxylate or an organic phosphate, for example a phosphate ester. The activator may be, for example, a metal sulfate and a metal carboxylate, for example an aluminum carboxylate.

In a further embodiment, the gel-enhancing surfactant may include, for example, a quaternary amine having the formula:

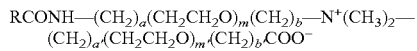

RCONH—$(CH_2)_a(CH_2CH_2O)_m(CH_2)_b$—$N^+(CH_3)_2$—$(CH_2)_{a'}(CH_2CH_2O)_{m'}(CH_2)_{b'}COO^-$ in which R is an alkyl group that contains from about 17 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to 10 if m is 0; a' and b' are each 1 or 2 when m' is not 0 and (a'+b') is from 1 to 5 if m is 0; (m+m') is from 0 to 14; and $CH_2CH_2O$ may also be $OCH_2CH_2$. An example is N-cis-13-docosenoic-N,N,-bis(2-hydroxymethyl)-N-methyl ammonium chloride; a further example is a betaine, for further example erucylamidopropyl betaine, or oleylamidopropyl betaine, or mixtures of these.

In another embodiment, the gel-enhancing surfactant may be a cationic surfactant, for example one including (Z)-13-docosenyl-N-N-bis (2-hydroxyethyl) methyl ammonium chloride.

In yet other embodiments, the gelled fluid may contain an alcohol, for example methanol, an acid, for example an emulsified acid, and/or a breaker, for example sodium acetate, sodium carbonate or sodium bicarbonate.

Another embodiment is an oilfield treatment method including injecting a gelled fluid containing a non-aqueous base oil, a gelling agent, an activator, and a gel-enhancing surfactant in an amount sufficient to increase the viscosity of the fluid, into a wellbore. In the term "injecting", which normally implies that the fluid will enter the formation, we include "spotting", which normally implies that the fluid stays in the wellbore (in which term we also include pipelines) and may or may not enter the formation. By saying that the gel-enhancing surfactant increases the viscosity of the fluid, we mean that it increases the viscosity of the fluid at a shear rate it experiences during use. The oilfield treatment is, for example, hydraulic fracturing, frac packing, gravel packing, diversion, fluid loss control, lost circulation control, sand control, wellbore cleanout, a gel pig, wellbore or pipeline sweeping, organic scale dissolution, organic scale removal, or drilling. As a further example, the method is a method of cleaning out a wellbore involving injecting a gelled fluid containing a non-aqueous base oil, a gelling agent, an activator, and a gel-enhancing surfactant in an amount sufficient to increase the viscosity of the fluid, into the wellbore through coiled tubing or drill pipe.

DETAILED DESCRIPTION OF THE INVENTION

Figure 1A:
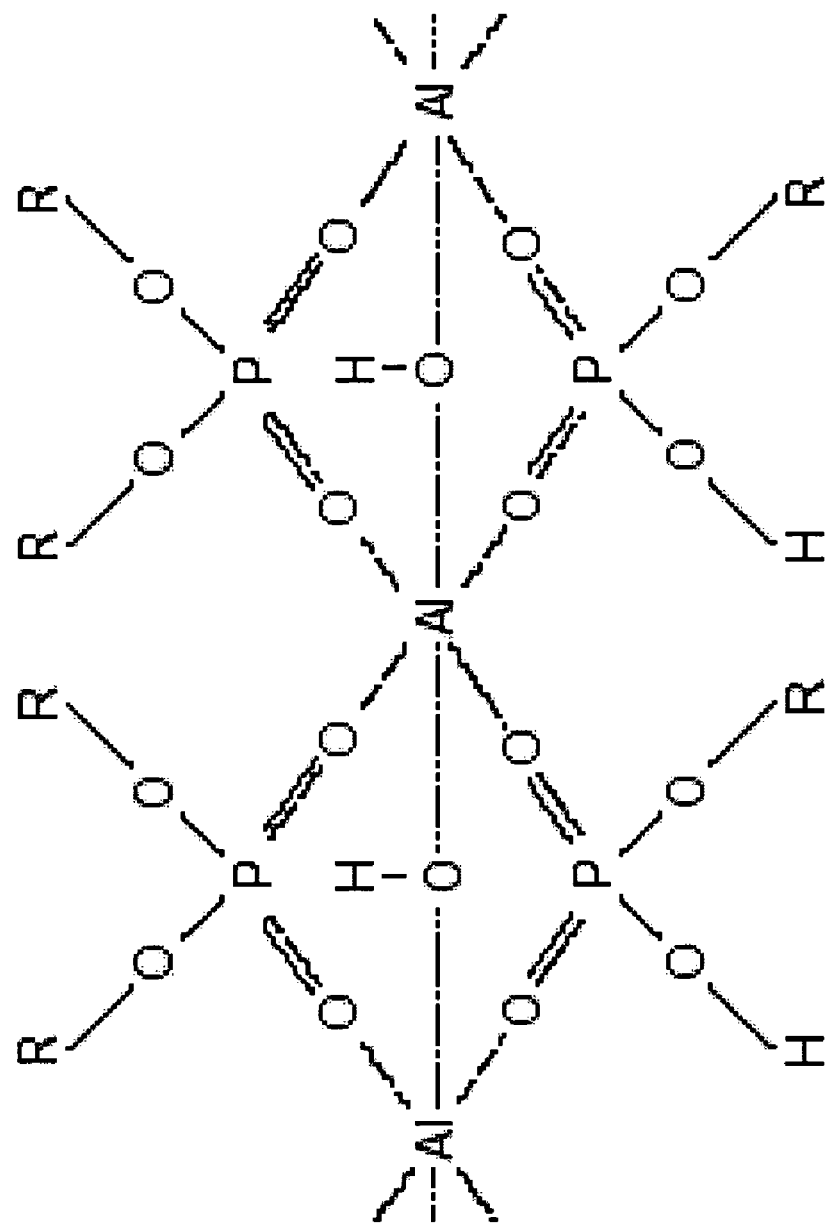
FIG. 1A shows the structure of conventional phosphate based gelled oils.

Embodiments of the invention are gelled non-aqueous base fluids (commonly called "gelled oils") containing gel-enhancing surfactants to improve their properties, and uses of these fluids. The base fluids are substantially or entirely hydrocarbons. The preferred base fluid is diesel, which is typically a mixture of aromatics and saturated and unsaturated aliphatics, and which may contain trace amounts of compounds containing oxygen, sulfur, and nitrogen. Other suitable base fluids include for example kerosene, paraffinic oil, ether, crude oil, condensate, toluene, xylene, and mineral oil, biodiesel, limonene and mixtures thereof. Suitable oil gelling agents were discussed above; suitable gel-enhancing surfactants will be detailed below. Conventional gelled oils are called GO fluid systems here; the gelled oil containing a gel-enhancing surfactant is called a V-GO fluid system.

The presence of even small amounts of gel-enhancing surfactants increases the viscosity of a gelled oil at least several fold. The effect tends to be more pronounced at lower viscosities. At high shear conditions (for example at about 1000 $sec_{-1}$), a V-GO and a GO may sometimes show similar viscosities but at lower shear rates (for example at less than about 200 $sec^{-1}$) a V-GO typically has significantly higher viscosity. The presence of even small amounts of gel-enhancing surfactants also increases the solids suspension capacity of a gelled oil system because the V-GO fluid systems are viscoelastic, not merely viscous. The presence of gel-enhancing surfactants makes gelled oil systems less sensitive to the (1) concentration of additives and (2) the nature of the base oil. Because of the efficient sand suspension characteristics, foaming is not requiring for sand suspension in fracturing or sand control applications or in use in coiled tubing (CT) cleanout. If foaming (in which term we include energizing) is desired, the gel-enhancing surfactants assist in foaming the hydrocarbon, or may be the only foaming agent required; fluorocarbon-based additives are not required. The V-GO systems may be used alone as a fluid, as a foam or energized. The V-GO systems may be used in stages with other treatment fluids. Since the V-GO systems are viscous, they generally do not need diverters. When they are foamed or energized, the need for other diverters is even less. V-GO fluid systems have many uses. They are used as the main treatment fluid in hydraulic fracturing, and in the sand control treatments gravel packing and frac packing. They are used as diverters, for example in acid fracturing, where they are pumped in stages alternating with acids or retarded acids such as emulsified acids. They are used as fluid loss control fluids, kill fluids, and lost circulation fluids with or without added solids, including fibers. They are used as the main fluid in oil based drilling fluids and are compatible with fibers, $CaCO_3$, barite, hematite and other weighting agents. They are used over a broad temperature range because they have greater thermal stability than conventional gelled oils. They are used to make stable slurries of solid additives for better metering and delivery. Although precise experiments have not been performed, it is believed that V-GO fluid systems have lower friction pressures than GO fluid systems.

Gel enhancing surfactants include, for example, viscoelastic surfactants that form wormlike micellar structures at certain concentrations in the presence of water or brine, and are broken once in contact with hydrocarbons or diluted with more water or brine. The entanglement of the micellar structures results in the viscosity and viscoelasticity of the system. Because of the viscoelasticity, these water-based viscoelastic surfactant systems have superior solids suspension capabilities. Hence, these non-damaging systems are extensively used in fracturing and sand control applications. (Samuel, M., Card, R. J., Nelson, E. B., Brown, J. E., Vinod, P. S., Temple, H. L., Qu, Q. and Fu, D. K,: "Polymer-free Fluid for Fracturing," paper SPE 38622 presented at the 1997 SPE Annual Conference and Exhibition, San Antonio, Tex., 5-8 October.

Hydrocarbons can break these fluids into water-like viscosity; hydrocarbons are sometimes used as the breaker for water-based viscoelastic surfactant systems. In the current invention, however, viscoelastic surfactants are exemplary gel-enhancing surfactants used to increase the viscosity and create viscoelasticity in hydrocarbon systems that have been gelled to generate viscosity with phosphates and aluminum additives (or with carboxylates and aluminum additives). Not to be limited by theory, but FIG. 1B shows a schematic of the mechanism by which gel-enhancing surfactant fluids may enhance the viscosity of the gelled oil.

Figure 1B:
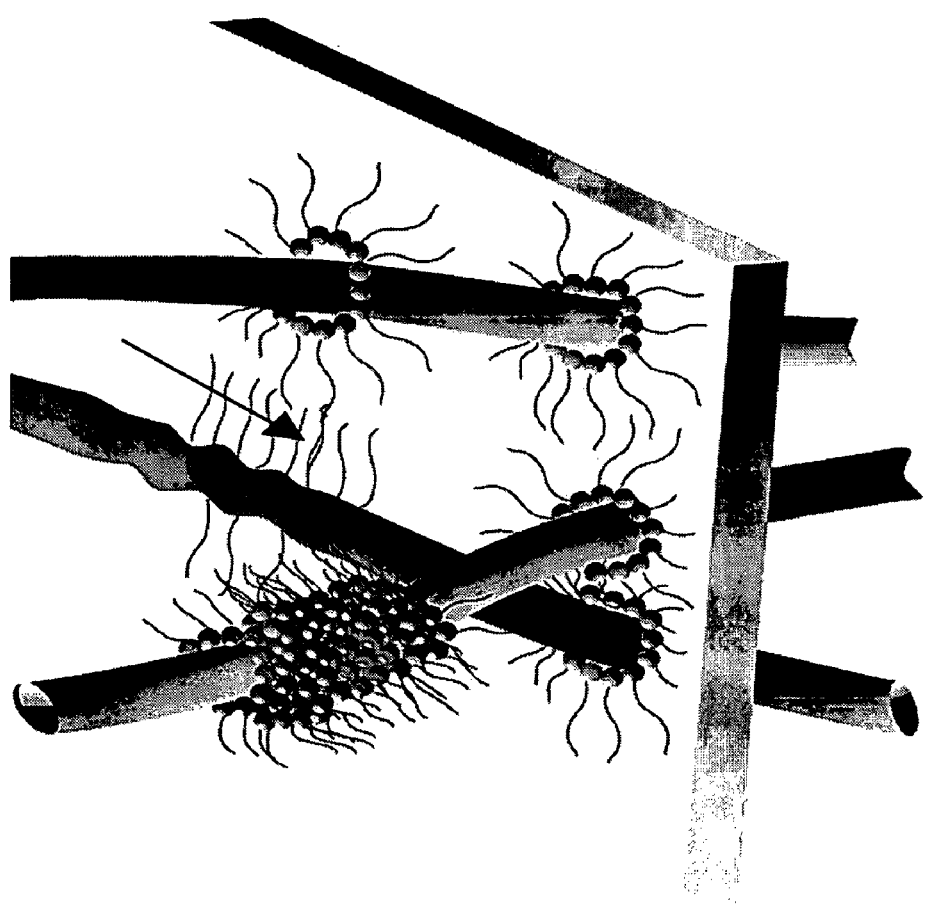
FIG. 1B shows a schematic of the mechanism by which gel-enhancing surfactants may enhance the viscosity of a gelled oil.

The large tubes in FIG. 1B represent the aluminum phosphate skeleton formed in a conventional commercial gelled oil. The long R-group on this skeleton (arrow) interacts with the hydrocarbon and results in the viscosity of the gelled oil. When gel-enhancing surfactant is added, it locates itself around the aluminum phosphate skeleton and enlarges it, with the polar head of the gel-enhancing surfactant adjacent to the aluminum phosphate skeleton. The non-polar tail group of the gel-enhancing surfactant further enhances the interaction with the hydrocarbon present in the base fluid.

Many surfactant types are useful for the present invention. Although experiments have not been performed with all classes of surfactants, it is believed that all surfactants that form viscoelastic fluids in aqueous systems are suitable for enhancing the properties of gelled oils. Several types of zwitterionic surfactants have been found to be particularly useful in improving gelled oil systems. In general, suitable zwitterionic surfactants have the formula:

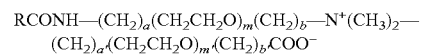

in which R is an alkyl group that contains from about 17 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to 10 if m is 0; a' and b' are each 1 or 2 when m' is not 0 and (a'+b') is from 1 to 5 if m is 0; (m+m') is from 0 to 14; and $CH_2CH_2O$ may also be $OCH_2CH_2$. Preferred gel-enhancing surfactants are betaines.

Two examples of very suitable betaines are called, respectively, BET-O-30 and BET-E-40. The gel-enhancing surfactant in BET-O-30 is shown below; one chemical name is oleylamidopropyl betaine. It is designated BET-O-30 because as obtained from the supplier (Rhodia, Inc. Cranbury, N.J., U.S.A.) it is called Mirataine BET-O-30 because it contains an oleyl acid amide group (including a $C_{17}H_{33}$ alkene tail group) and contains about 30% active surfactant; the remainder is substantially water, sodium chloride, and propylene glycol.

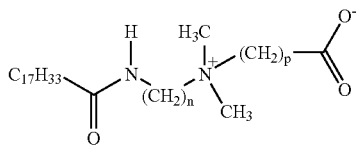

The gel-enhancing surfactant in BET-O-30 (when n=3 and p=1) and in S-2.

An analogous material, BET-E-40, is also available from Rhodia and contains an erucic acid amide group (including a $C_{21}H_{41}$ alkene tail group) and is 40% active ingredient, with the remainder being substantially water, sodium chloride, and isopropanol. The surfactant in BET-E-40 is also shown below; one chemical name is erucylamidopropyl betaine.

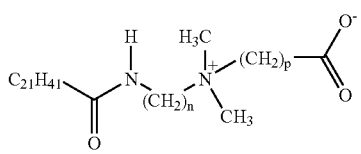

The gel-enhancing surfactant in BET-E-40 (S-1) (when n=3 and p=1).

BET surfactants, and others, are described in U.S. Pat. No. 6,258,859; a copy of which is attached and forms a part of this Patent Application. According to U.S. Pat. No. 6,258,859, BET surfactants form viscoelastic gels when in the presence of certain organic acids, organic acid salts, or inorganic salts; the inorganic salts may be present at a weight concentration up to about 30%.

Another suitable gel-enhancing surfactant is N-cis-13-docosenoic-N,N,-bis(2-hydroxymethyl)-N-methyl ammonium chloride (also known as N-erucyl-N,N-bis(2-hydroxyethyl)-N-methyl ammonium chloride). This and other suitable amine and quaternary amine gel-enhancing surfactants are described in U.S. Pat. No. 5,964,295, a copy of which is attached and forms a part of this Application. Mixtures of gel-enhancing surfactants are also suitable.

Certain co-surfactants may be useful, in particular for BET-O-type gel-enhancing surfactants (as in S-2, below). An example given in U.S. Pat. No. 6,258,859 is sodium dodecylbenzene sulfonate (SDBS). Although gel-enhancing surfactant's are preferably used without this type of co-surfactant in the present invention, they may be used with this type of co-surfactant, for example those having the SDBS-like structure in which the side chain has from about 6 to about 16 carbon atoms; preferred examples of this type of co-surfactant are those in which the side chain has from about 8 to about 16 carbon atoms. Other suitable examples of this type of co-surfactant for BET-O-30 and similar surfactants are certain chelating agents such as trisodium hydroxyethylethylenediamine triacetate.

There are many uses of V-GO's; they are used wherever there is a need for stable, preferably viscoelastic, oil-based fluids (in industrial cleaning, pharmaceuticals, personal care products, and agriculture, for example). V-GO's are used as would be aqueous-based viscous fluids or conventional gelled oils, except that there are many advantages that may allow them to be used with less or simpler equipment, with less hydraulic horsepower, with fewer additives, at lower viscosity, and with other modifications to normal operations that would be apparent to skilled operators knowing the properties of the V-GO's. Brief discussions of major oilfield uses follow.

Hydraulic Fracturing/Frac Packing/Sand Control Fluids: Water-based linear and crosslinked borate, zirconate, titanate and other metal and mixed metal crosslinked polymer fluids are generally used in fracturing, frac packing and sand control applications. Crosslinked fluids are very effective in transporting sand/gravel/proppant/fiber/drill cuttings/fluid loss additives and other solids because of their good solids suspension characteristics. However, there are some serious limitations to the use of conventional aqueous crosslinked systems. They typically have either a high pH (borate and zirconate) or a low pH (titanates); they typically require many additives including polymers, crosslinkers, pH control agents, buffers, high temperature stabilizers, biocides, and others; and there is formation damage associated with polymers that results in low retained permeabilities. Water-based systems like these can swell clays and so clay stabilizers are needed and they are not recommended for highly water sensitive formations.

Because of the high sensitivity of some formations to water, gelled oils are often recommended. Gelled oils have the following advantages relative to aqueous crosslinked polymers, in addition to the simple fact of their being oil-based. Gelled oil systems use fewer additives compared to crosslinked systems, there are no concerns with pH, and they are less damaging because they contain no polymers.

However, currently used (conventional) gelled oils have disadvantages and limitations. Viscosity generation with gelled oils is highly dependent upon the nature of the base oil, the possible presence of contaminants, and the concentration and compositions of additives, so extensive quality assurance/quality control (QA/QC) with the specific formulation planned for use is required before every treatment. The concentrations of additives must be optimized each time gelled oils are used. Since the aluminum compounds used as one of the additives have a tendency to precipitate, the concentration of the active ingredient in field use normally turns out to be lower than was intended; this is another reason why careful QA/QC at location and optimization of the system with field samples is needed. The viscosities of conventional prior art gelled oils are low and minor concentration changes in the additives can "flash break" the system (that is, break it very quickly and completely). The flash break can occur at concentrations close to the optimal concentrations for maximal viscosity. This is yet another reason for the need for careful QA/QC and optimization of the ratio of gelling agent to activator. For all these reasons, conventional GO systems are not very robust and not widely accepted. Furthermore, the solids suspension capability of conventional gelled oils is low and treatments are therefore limited to high flow rates (high pump rates) or low concentrations of sand/proppant/gravel. Because of the low solids suspension characteristics, foaming is often needed. Foams are usually not stable in a hydrocarbon environment and often fluorocarbon surfactants must be used when foaming of hydrocarbons is required. Fluorocarbon compounds are expensive and are not environmental friendly and their availability in some parts of the world is very limited. Conventional gelled oils have limited stability, and normally can be used only up to only about 107° C. (225° F.). When precautions are taken to avoid some of the other problems, the resulting conventional gelled oils may have high additive concentrations and consequently undesirably high viscosities. These systems are batch mixed and are difficult to get out of the mixing tanks.

On the other hand, there are many advantages to using Viscoelastic Gelled Oils (V-GO's). First, they have all the advantages of conventional gelled oils. Also, they can be used at higher temperatures (up to at least about ~177° C. (~350° F.)). They contain no polymeric additives and so they do not form filtercakes or leave polymer behind in proppant or gravel packs. Only very low concentrations of gel-enhancing surfactants are used. V-GO's have high low-shear viscosities leading to good sand suspension characteristics, but their high shear viscosities are not very high, making them easier to pump through the equipment and tubulars. High proppant concentrations can be used. The fluids have low friction pressures. Although it is recommended, these fluid systems do not require careful QA/QC at the laboratory or in the field and little or no optimization is required. The formulations are successful with many base oils, such as kerosene, diesel, frac oil, liquid paraffin, crude oil, and mixtures of these. V-GO's are compatible with fluid loss additives if they are needed; they can be used in stages with aqueous polymer-based or acid-based systems; they can be foamed or energized; they are compatible with $N_2$ and $CO_2$ or mixtures without additional additives. The breaking mechanism is similar to that of conventional GO fluids, but the "flash break" observed for GO systems has not been seen in any of the experiments described below with V-GO systems. The fluid systems can be batch mixed or pumped on the fly (continuous mixing). Continuous mixing of V-GO is operationally very simple. The order of addition is not important at short times and pre-hydration or incubation are not needed. The fluid systems can also be partially batch-mixed (the conventional gelled oil components) and the gel-enhancing surfactant can then be added on the fly. Crystalline silica (silica flour) or mica with or without starch make excellent fluid loss additives at a recommended concentration of from about 1.2 to about 3.6 g additive per liter (about 10 to about 30 pounds additive per thousand gallons of fluid).

Coiled Tubing (CT) Cleanout Fluids: Aqueous linear polymer gels and foams are generally used for sand cleanout. Crosslinked fluids are not often used because of their high viscosity; for best cleanout performance, fluids should be in turbulent flow when pumped, which translates into high flow rates at which friction pressures of very viscous fluids would be excessive. Gelled oils are used in coiled tubing cleanout applications in water sensitive formations. Because of the low sand suspension capabilities of GO systems, however, high flow rates are needed to clean out sand. When pumping at high rates, foaming of the fluid is often recommended. Gelled oils are difficult to foam, often requiring fluoro compounds that are not environmental friendly as surfactants. In addition, friction losses with conventional gelled oil fluids are generally higher than with water-based fluids, especially in turbulent flow.

In CT cleanout operations, V-GO systems have all the advantages of conventional GO systems. In addition, V-GO systems have very good sand/fine/solids suspension characteristics. They have high low-shear viscosity so that even if a CT cleanout job is shut off for unexpected reasons before completion, the solids remain in suspension. This avoids "stuck" CT in cleanout operations. V-GO systems use lower concentrations of additives than conventional GO systems and can take advantage of the formation of viscoelastic, not merely viscous, gels so that cleanouts are less dependent on flow rates. On the other hand, the presence of gel-enhancing surfactants allows V-GO's to give lower friction pressures than GO's. Additional foaming agents are not required if foaming is desired, but foaming is not necessarily required for efficient and effective cleanout. The other observations made above in the discussion of hydraulic fracturing/frac packing/sand control are relevant to CT cleanout as well (such as those regarding foaming, QA/QC, robustness, and mixing). V-GO fluid systems can be recycled (re-used) in CT operations.

A typical very conservative CT cleanout with V-GO is conducted as follows. The well is approximately 1859 m (approximately 6100 feet) deep, is completed with perforated 7.30 cm (2⅞ inch) tubing, and 67 m (220 feet) of solids must be cleaned out. 3.8 Cm (1½) CT is used. The CT is filled with diesel and run in hole without circulating. The well is then opened to flow at about 0.69 MPa (100 psig) above the trunk-line pressure; washing the fill is started while advancing the CT and circulating diesel to a depth about 15.2 m (50 feet) below the top of the fill; the tubing is pulled to about 6.1 m (20 feet) above the perforations; and diesel circulation is stopped and the well is shut in for about 30 minutes. The CT is run in without circulating to about 3.05 meters (about 10 feet) above the fill; the well is opened, and about 3785 liters (about 1000 gallons) conventional gelled oil followed by about 1892 liters (about 500 gallons) of V-GO foamed with nitrogen is circulated while moving the CT up and down about every 7.6 m (25 feet) to prevent sand settling and allowing the CT to become stuck. The GO and V-GO steps are repeated in alternation, optionally with the GO also foamed, until no sand is being recovered over the interval to be cleaned; then diesel containing breaker is circulated; then the CT is pulled out of the hole while circulating diesel. In a less conservative method, the CT is not reciprocated because of the excellent sand carrying capacity of the V-GO. In an even more aggressive method, only V-GO is used, and in the most aggressive method, that V-GO is not foamed. The simplest method is V-GO only. The second easiest is V-GO fluid and V-GO foam. The third is GO and V-GO foam. The last is GO and GO foam.

Oil-Based Drilling Fluids: Conventional oil-based muds (OBM's) give better gauged holes (with less washout) and undergo less reaction with formations and so create less formation damage than water-based muds. Among the limitations of OBM's however are that they require several additives; they undergo settling at high temperatures; they are expensive; and they have handling issues. On the other hand, V-GO-based drilling fluids require fewer additives; are more predictable; are less expensive; have better suspension characteristics; suffer less loss to formations (which is very important) because of their high low-shear viscosities; are compatible with $CaCO_3$, barite and hematite and can be weighted as much as required; are compatible with brines; are compatible with fibers; are compatible with fluid loss additives; and give no solids settling and thus it is easy to achieve heavy (high density) systems. Polymers may be used to further minimize leakoff.

Oil-Based Fluid Loss Control/Lost Circulation Systems: Conventional oil-based systems are not used for fluid loss or lost circulation control. However, the extremely high low-shear viscosities of the V-GO fluid systems make them good fluid loss and lost circulation control systems. Their shear thinning behavior makes them easy to pump; the lower number of additives makes them easy to make; they are insensitive to the nature of the base hydrocarbon used; the systems can be used with CaCO3, barite, and/or hematite to minimize leakoff; these solids may be sized to help minimize losses further, and glass, nylon, polyester, etc. fibers may be used with the systems to minimize the leakoff even further. The use of fluid loss or lost circulation supplemental additives with or without polymers (natural and synthetic) also helps, as does the use of hydrocarbon resistant flakes.

Diversion Fluids: Since the V-GO systems are viscous, they generally do not need diverters themselves. When they are foamed, the need for diversion is even less. On the other hand, the V-GO systems are used as diverters for subsequently injected fluids, including processes in which diverter stages alternate with stages of the fluid or fluids to be diverted. Although the systems examined so far are somewhat sensitive to acid (see example 12) they are useful for diversion of acids, in particular for diverting emulsified acids. They are also used to divert a variety of other fluid systems such as scale dissolvers. For incompatible fluids, a spacer is used.

Organic Scale Dissolution and Removal, Perforation Fluid, and Gel Pig: V-GO fluid systems can be used to dissolve and remove organic deposits, particularly in wellbores, although also in pipelines, tools, and in many other places. They may be used in an analogous manner in industrial cleaning. In this use they may contain various additives such as paraffin or asphaltene inhibitors, and paraffin or asphaltene dispersing agents, and the base oil may advantageously be kerosene, xylene or toluene. The most common targets in the oilfield are asphaltene and paraffin (wax) deposits. Such deposits may also be mixed with inorganic deposits (scales) and in that case the V-GO dissolver may contain a suitable chelating agent or other scale dissolvers. The viscosity of the systems helps to keep the loose scales in suspension. Because of the high viscosity of the systems they behave like slugs. They will therefore also sweep any debris from a wellbore or pipeline when used to dissolve and remove deposits; or they may be used to sweep out debris even in the absence of organic or organic/inorganic deposits. This system is also used to swap water and other liquid and/or semi solid materials from horizontal or deviated wells and pipelines. This fluid is also used as a perforation fluid, i.e. the fluid within the casing during perforation.

Slurry Preparation: Solids are sometimes suspended or slurried in non-aqueous fluids such as diesel for better metering, especially in the field. Settling of the solids in high concentration slurries can be a problem. V-GO systems may be used to create particularly stable slurries of solids in non-aqueous fluids. For example, a slurry in diesel of the $Na_2CO_3$ used as a breaker in GO systems is suspended better in a V-GO fluid system and can be metered more evenly and accurately; that is, it is suspended in diesel better if a n appropriate VES is added.

EXPERIMENTAL

A representative phosphate ester (PH-1), aluminum complex (AL-1) and gel-enhancing surfactant (S-1) were used in most of the experiments. PH-1 is a mixture of 80% of a mixture of ethyl, octyl and decyl esters of phosphoric acid (made from 15% phosphoric anhydride, 25% triethyl phosphate and 60% of approximately equal parts C8 and C10 linear fatty alcohols) and 20% of a heavy aromatic solvent, which is about 75% aromatics and 25% paraffinic petroleum distillates. AL-1 is a mixture of about 24% 2-ethylhexan-1-ol and 59% aluminum triisopropanolate in diesel oil. S-1 is a mixture of about 39% erucic amidopropyl dimethyl betaine, 22% isopropanol and 5% sodium chloride in water. All amounts given are for as-received materials. When S-1 is mixed 50/50 with methanol, the mixture is called S-IM. V-GO means a gelled oil containing a gel-enhancing surfactant that imparts improved properties, for example viscoelasticity.

In typical commercial gelled oils, the concentration of PH-1 used ranges from about 6 to about 8 ml/L (about 6 to about 8 gallons per 1000 gallons (gpt)) base oil and the concentration of AL-1 used ranges from about 1 to about 2.5 ml/L. The preferred concentration of PH-1 is about 2.5 to 3.3 times the concentration of AL-1 in many cases, although this factor depends on the exact nature of the base oil and additives and on the stability of the additives. However, if the ideal concentration ratio is, for example, 3.3, that concentration would not often be used because often there is a dramatic and immediate break observed if the ratio is increased only slightly above that optimal concentration, for example increased from about 3.3 to about 3.4.

The Kitchen Blender is a motorized blender that provides from about 500 to about 1000 rpm. The Waring Blender is a commercial laboratory blender that provides up to 10,000 rpm. Viscometers used were a Fann 35 Rheometer with heating cup, and a Fann 50 Rheometer or similar.

Example 1

This example shows the preparation of a conventional (prior art) gelled oil (GO): 5 ml of PH-1 and 1.2 ml of AL-1 were added to 1 L of diesel in that order in a Kitchen Blender. The fluid was mixed at low shear for 15 minutes at room temperature. (Conventional gelled oils generate good gels in about 15 minutes at what we will call low shear (on the low speed (about 500 rpm) of the Kitchen Blender). They generate good gels in about 3 to 5 minutes at what we will call high shear (for example 4000 rpm on a Waring Blender.) At higher shears the viscosity is generated quickly but there may be some non-recoverable shear degradation. All gels made in this and the following examples were made at low shear unless indicated otherwise.) The viscosity was measured with the Fann 35 rheometer unless otherwise specified. The viscosities at different shear conditions were measured at various temperatures Results are shown in Table 1. Lower concentrations, and a higher ratio (in this case 4.16) of PH-1 and AL-1 than is normally recommended for conventional prior art gelled oil systems were used successfully, although the gelled oil was not very viscous, was not viscoelastic, and was not very thermally stable. These amounts will be used in many of the following experiments to demonstrate the effectiveness of the addition of gel-enhancing surfactants to gelled oils.

TABLE 1

| Diesel (solvent) + 5 ml/L PH-1 + 1.2 ml/L AL-1 | | | |
|---|---|---|---|
| | Shear Rate | | |
| Temperature | $40\ sec^{-1}$ | $170\ sec^{-1}$ | $511\ sec^{-1}$ |
| 27° C. | 55 | 40 | 32 |
| 38° C. | 52 | 37 | 29 |
| 49° C. | 36 | 23 | 16 |
| 60° C. | 28 | 16 | 11 |
| 71° C. | 25 | 13 | 8 |

Example 2

This example shows the preparation of conventional (prior art) gelled oils with higher AL-1 concentrations: The data are given under example 5 and show that at a constant concentration of PH-1 and increasing amounts of AL-1 (lower ratios of PH-1 to AL-1) the viscosity increased a modest amount. It is believed that 1.2 ml/L AL-1 is about the lowest concentration that should be used with 5 ml/L PH-1 without risking an abrupt break in this system. However, because the addition of a gel-enhancing surfactant made this fluid system much more robust (much less sensitive to the concentrations and ratios of the additives) most of the work detailed below was done with the "dangerous" concentrations of 5 ml/L PH-1 and 1.2 ml/L AL-1. When a suitable gel-enhancing surfactant was used, the fluid systems were always satisfactory and were always better than the fluid systems made without the addition of the gel-enhancing surfactant, even with those amounts of additives.

Example 3

This example shows the preparation of exemplary viscoelastic gel-enhancing surfactant/gelled oil systems (V-GO's) of the invention: 5 ml of PH-1, 1.2 ml of AL-1, and 5 ml of S-1 were added to 1 L of diesel in that order in a kitchen blender. The fluid is mixed at low shear for 15 minutes at room temperature. The viscosity was measured with the Fann 35 rheometer unless otherwise specified. The data under various conditions are given in Table 2.

TABLE 2

Diesel (solvent) + 5 ml/L PH-1 + 1.2 ml/L AL-1 + 5 ml/L S-1

| | Shear Rate | | |
|---|---|---|---|
| Temperature | 40 sec$^{-1}$ | 170 sec$^{-1}$ | 511 sec$^{-1}$ |
| 27 C. | 399 | 112 | 43 |
| 38 C. | 399 | 112 | 43 |
| 49 C. | 388 | 112 | 42 |
| 60 C. | 415 | 120 | 46 |
| 71 C. | 401 | 116 | 47 |

Note that experiments have shown that if S-1 is added to diesel and the mixture is maintained at ambient temperature for a long time, addition of PH-1 and AL-1 does not result in the generation of useful viscosity. If PH-1 and AL-1 are added to diesel first, then the S-1 may be added later, either before or after the gel has formed, and the expected improvement will result. If all three are added consecutively at ambient temperature in any order but without much time in between additions, a good gel can be generated. The exact time/shear/temperature relationship has not been optimized.

Addition of 5 ml/L to the base composition increased the viscosity dramatically at all temperatures under all shear rates. The dramatic increase at low-shear viscosity explains the much better solids carrying capacity of the above fluid. The fluid demonstrates more than 20,000 cP at 1 sec−1 shear rate and can be used for lost circulation treatments. V-GO's have been prepared with as little as 3 ml/L PH-1, 0.5 ml/L AL-1 and 0.5 ml/L S-1; any gel-enhancing surfactant concentration, even traces, is beneficial.

Although no experimental details are given, it was also found that V-GO fluid systems are compatible with water soluble and water insoluble solids such as fibers. The V-GO fluid system of example 3 was mixed with fiber glass fibers, polyester, and with novoloid (phenol-formaldehyde polymer) fibers; each dispersed well and with each present the fluid was stable.

Example 4

The gelled oil prepared by mixing 5 ml/L of PH-1 and 1.2 ml/L AL-1 in diesel was blended with 0.48 kg proppant added per liter of fluid (4 ppa (pounds of proppant added per gallon of fluid)) sand in a Waring blender for 1 min at 2000 rpm. A similar experiment was conducted with 1, 2 and 5 ml/L S-1 added. The fluids were transferred into measuring cylinders and the settling was observed.

Two hours after transferring the fluids into the measuring cylinders, all the sand had settled from the conventional gelled oil of example 1, while the sand was completely suspended in the V-GO system containing 5 ml/L S-1. Suspension was good in the fluids having 1 or 2 ml/L S-1. This type of experiment was repeated to observe the settling of sand in two of these fluids at a shorter time. After 2 minutes, at least 75% of the sand in the conventional GO system had settled, while in the V-GO system containing 5 ml/L S-1 there was no indication of settling. Furthermore, bubbles were visible in the V-GO system, showing that the V-GO system can be foamed. The V-GO fluid system has thus been demonstrated to possess good solids suspension characteristics for materials commonly used in oilfield operations such as hydraulic fracturing, gravel packing and frac-packing (0.5 to 16 ppa or higher sand, man-made proppants and resin coated, both curable and pre-cured, proppants). This V-GO fluid system can also be used to clean produced sand out of a wellbore, for example by injection through coiled tubing (CT).

This experiment clearly demonstrated that the presence of a gel-enhancing surfactant in the gelled oil made a dramatic difference in the solids carrying ability of the system. CT cleanout jobs have been performed previously with the system of Example 1 (in which no gel-enhancing surfactant was used). For CT cleanout jobs the fluid system of Example 1 may suitably be replaced by a fluid system containing 1 to 2 ml/L of gel-enhancing surfactant. For sand control and fracturing applications, where much higher sand loading is required, higher concentrations of gel-enhancing surfactant are recommended.

Example 5

The effect of the concentration of AL-1 on the rheology of gelled oil was also investigated. The result was then compared with the V-GO fluid system containing S-1. The results are shown in Table 3.

TABLE 3

| Fluid A: Diesel (solvent) + 5 ml/L PH-1 + 1 ml/L AL-1 | | | | Fluid B: Diesel (solvent) + 5 ml/L PH-1 + 1 ml/L AL-1 + 5 ml/l S-1 | | | |
|---|---|---|---|---|---|---|---|
| | Shear Rate | | | | Shear Rate | | |
| Temperature | 40 sec$^{-1}$ | 170 sec$^{-1}$ | 511 sec$^{-1}$ | Temperature | 40 sec$^{-1}$ | 170 sec$^{-1}$ | 511 sec$^{-1}$ |
| 27 C. | 36 | 20 | 13 | 27 C. | 51 | 22 | 12 |
| 38 C. | 25 | 12 | 7 | 38 C. | 51 | 22 | 12 |
| 49 C. | 23 | 11 | 6 | 49 C. | 54 | 22 | 11 |
| 60 C. | 19 | 8 | 4 | 60 C. | 54 | 22 | 11 |
| 71 C. | 17 | 6 | 3 | 71 C. | 54 | 22 | 11 |

TABLE 3-continued

| Fluid C: Diesel (solvent) + 5 ml/L PH-1 + 1.2 ml/L AL-1 | | | | Fluid D: Diesel (solvent) + 5 ml/L PH-1 + 1.2 ml/L AL-1 + 5 ml/l S-1 | | | |
|---|---|---|---|---|---|---|---|
| | Shear Rate | | | | Shear Rate | | |
| Temperature | 40 sec$^{-1}$ | 170 sec$^{-1}$ | 511 sec$^{-1}$ | Temperature | 40 sec$^{-1}$ | 170 sec$^{-1}$ | 511 sec$^{-1}$ |
| 27 C. | 55 | 40 | 32 | 27 C. | 399 | 112 | 43 |
| 38 C. | 52 | 37 | 29 | 38 C. | 399 | 112 | 43 |
| 49 C. | 36 | 23 | 16 | 49 C. | 388 | 110 | 42 |
| 60 C. | 28 | 16 | 11 | 60 C. | 415 | 120 | 46 |
| 71 C. | 25 | 13 | 8 | 71 C. | 401 | 118 | 47 |

| Fluid E: Diesel (solvent) + 5 ml/L PH-1 + 1.4 ml/L AL-1 | | | | Fluid F: Diesel (solvent) + 5 ml/L PH-1 + 1.4 ml/L AL-1 + 5 ml/l S-1 | | | |
|---|---|---|---|---|---|---|---|
| | Shear Rate | | | | Shear Rate | | |
| Temperature | 40 sec$^{-1}$ | 170 sec$^{-1}$ | 511 sec$^{-1}$ | Temperature | 40 sec$^{-1}$ | 170 sec$^{-1}$ | 511 sec$^{-1}$ |
| 27 C. | 111 | 61 | 39 | 27 C. | 458 | 125 | 47 |
| 38 C. | 78 | 55 | 43 | 38 C. | 458 | 125 | 47 |
| 49 C. | 72 | 50 | 38 | 49 C. | 459 | 126 | 47 |
| 60 C. | 54 | 39 | 31 | 60 C. | 459 | 126 | 47 |
| 71 C. | 46 | 32 | 24 | 71 C. | 464 | 128 | 48 |

Figure 2:
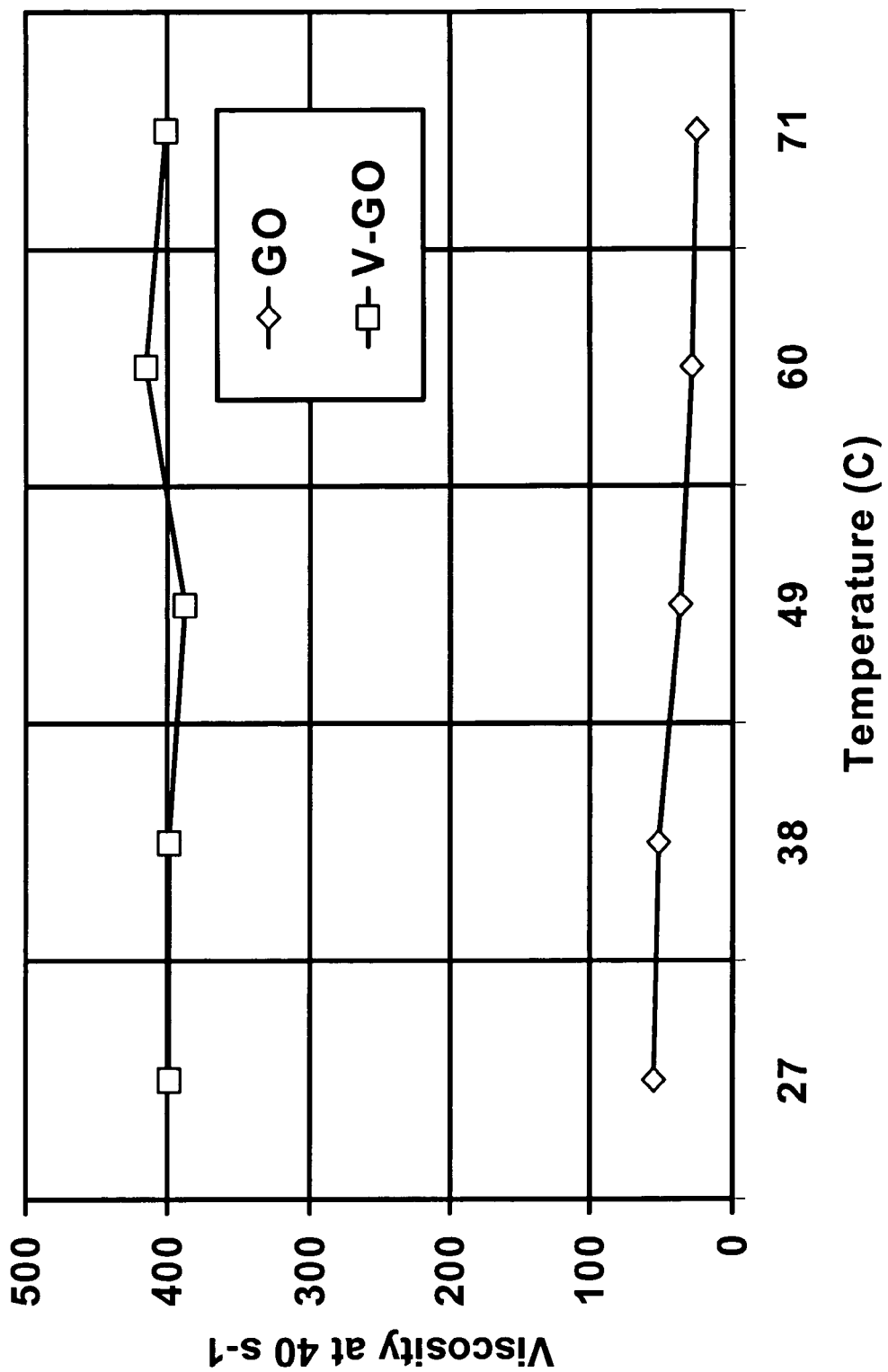
FIG. 2 shows a comparison of the viscosity of a fluid of the invention to that of a conventional gelled oil as a function of temperature at a shear rate of 40 sec$^{-1}$.
Figure 3:
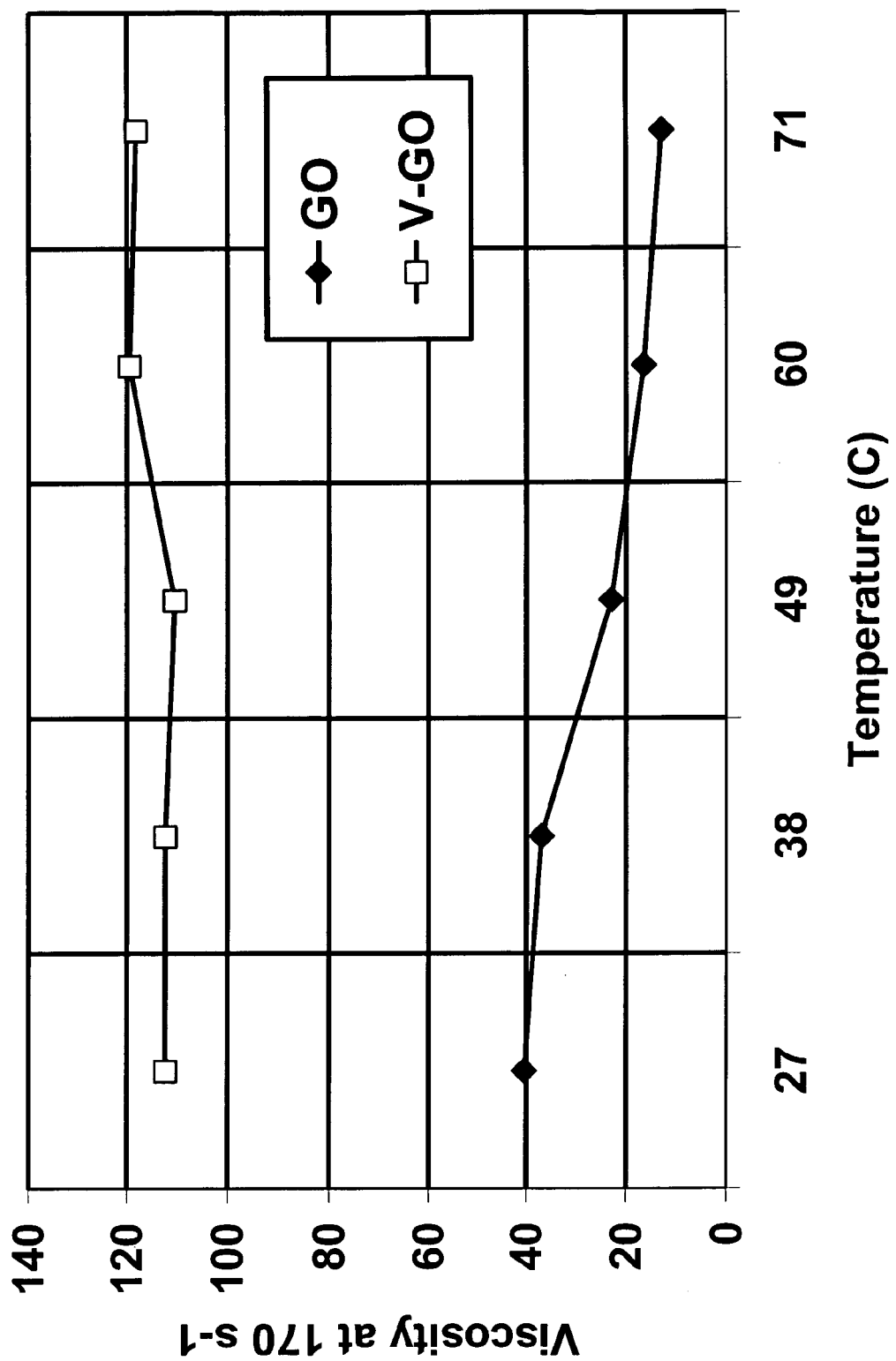
FIG. 3 shows a comparison of the viscosity of a fluid of the invention to that of a conventional gelled oil as a function of temperature at a shear rate of 170 sec$^{-1}$.
Figure 4:
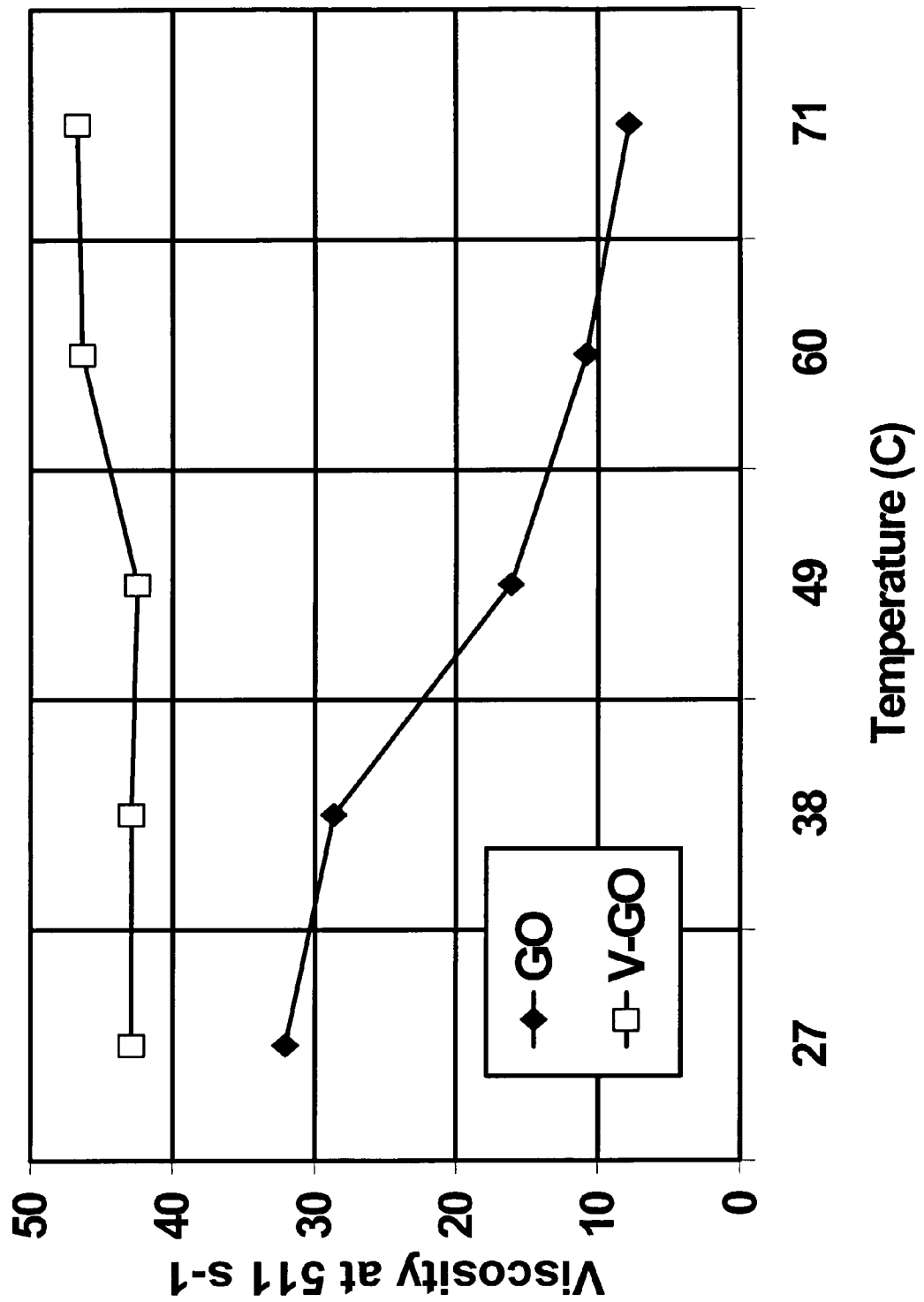
FIG. 4 shows a comparison of the viscosity of a fluid of the invention to that of a conventional gelled oil as a function of temperature at a shear rate of 511 sec$^{-1}$.

The data from some of the experiments shown in Table 3 (with 5 ml/L PH-1, 1.2 ml/L AL-1, and 0 or 5 ml/L S-1) are shown in FIGS. 2-4 for three different shear rates; they clearly show how the viscosity is enhanced by adding a gel-enhancing surfactant fluid at each shear rate.

Example 6

Figure 5:
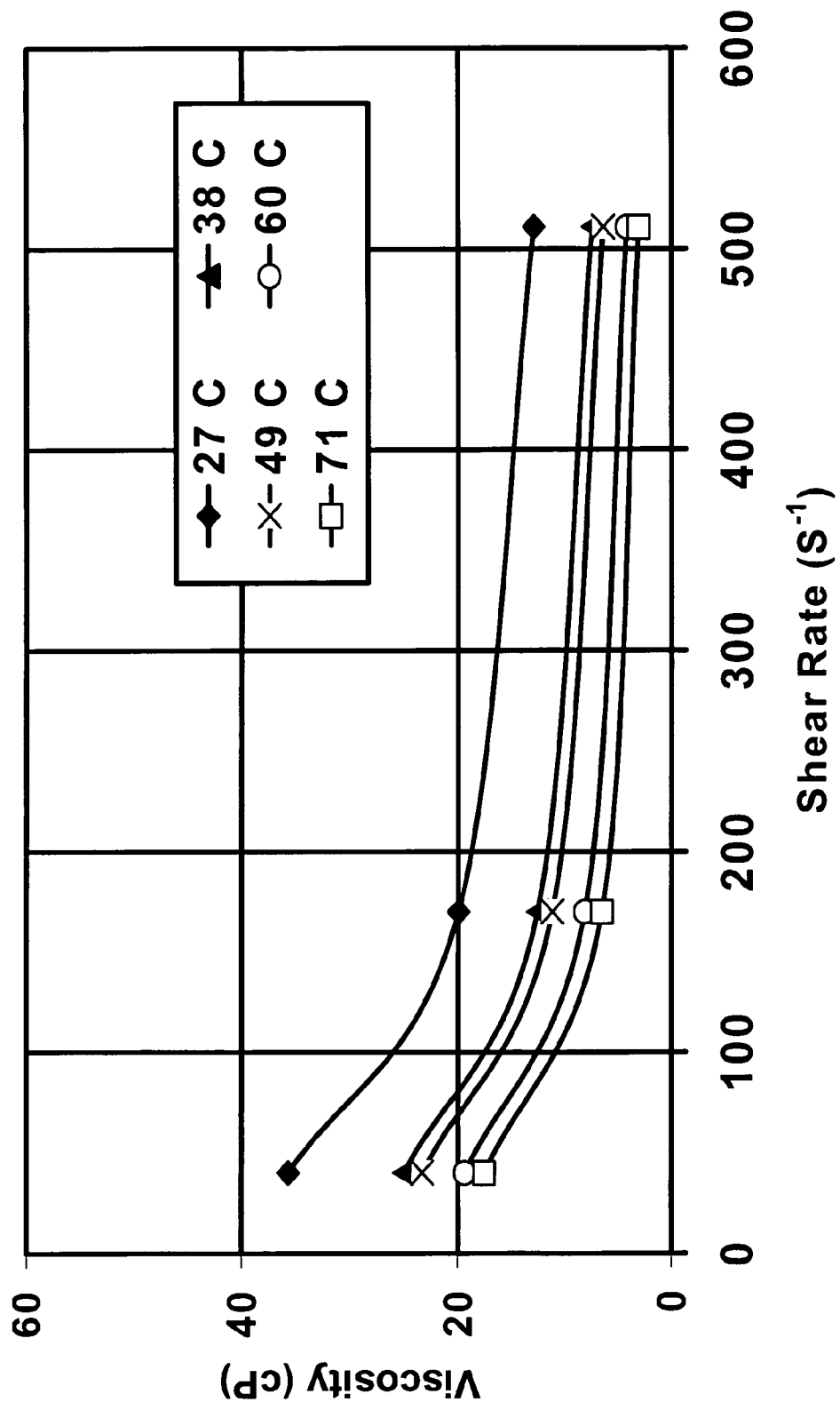
FIG. 5 shows the effect of shear rate on the viscosity of a prior art gelled oil fluid at different temperatures.
Figure 6:
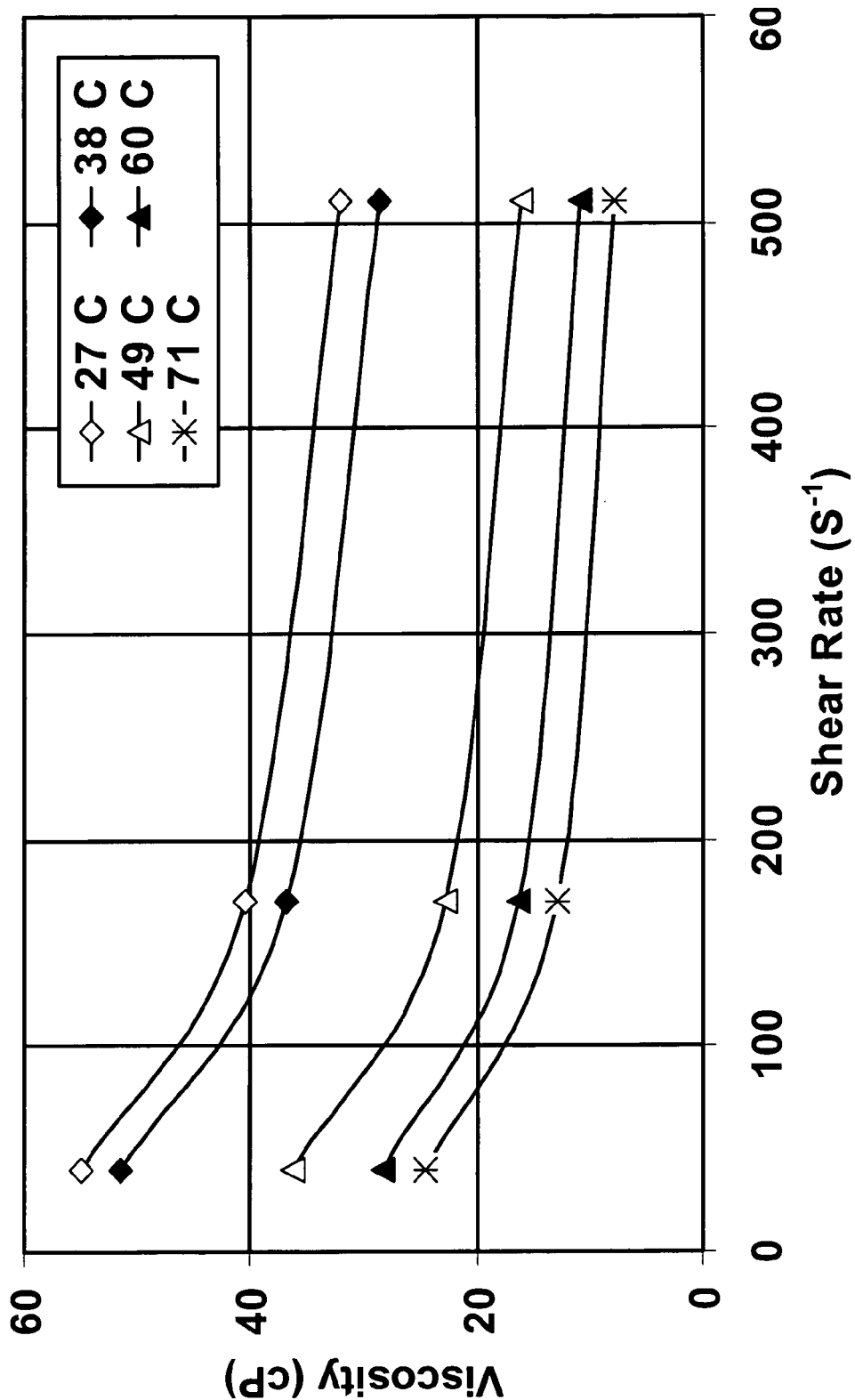
FIG. 6 shows the effect of shear rate on the viscosity of a prior art gelled oil fluid at different temperatures.
Figure 7:
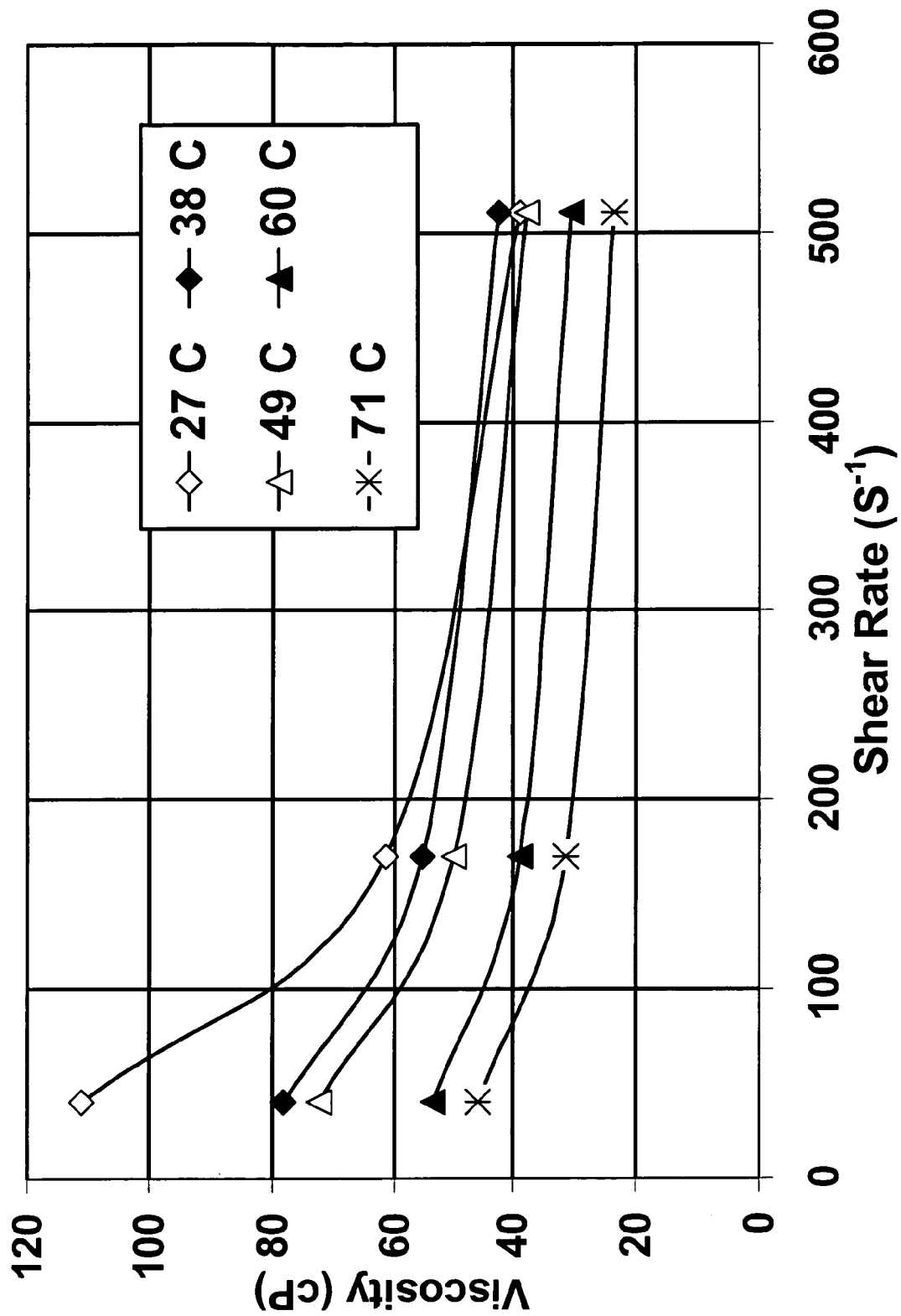
FIG. 7 shows the effect of shear rate on the viscosity of a prior art gelled oil fluid at different temperatures.

The effect of shear rate on the viscosity of the GO fluids (Fluids A, C, and E of Table 3) was examined at different temperatures. The results are shown in FIGS. 5-7. The fluids were shear thinning. Increasing the temperature was found to lower the viscosity of the conventional GO fluid systems drastically.

Example 7

Figure 8:
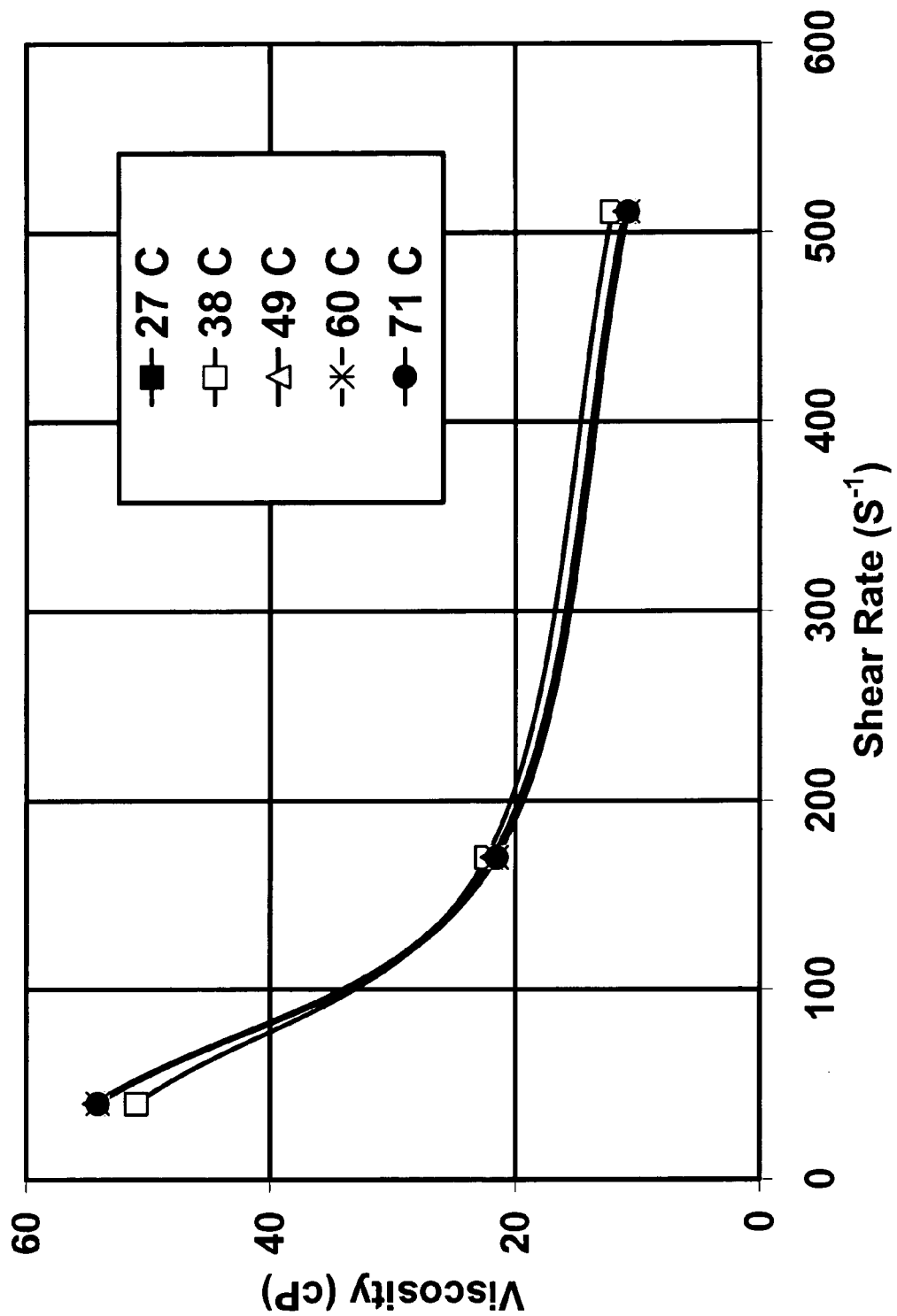
FIG. 8 shows the effect of shear rate on the viscosity of an exemplary gelled oil fluid of the invention at different temperatures.
Figure 9:
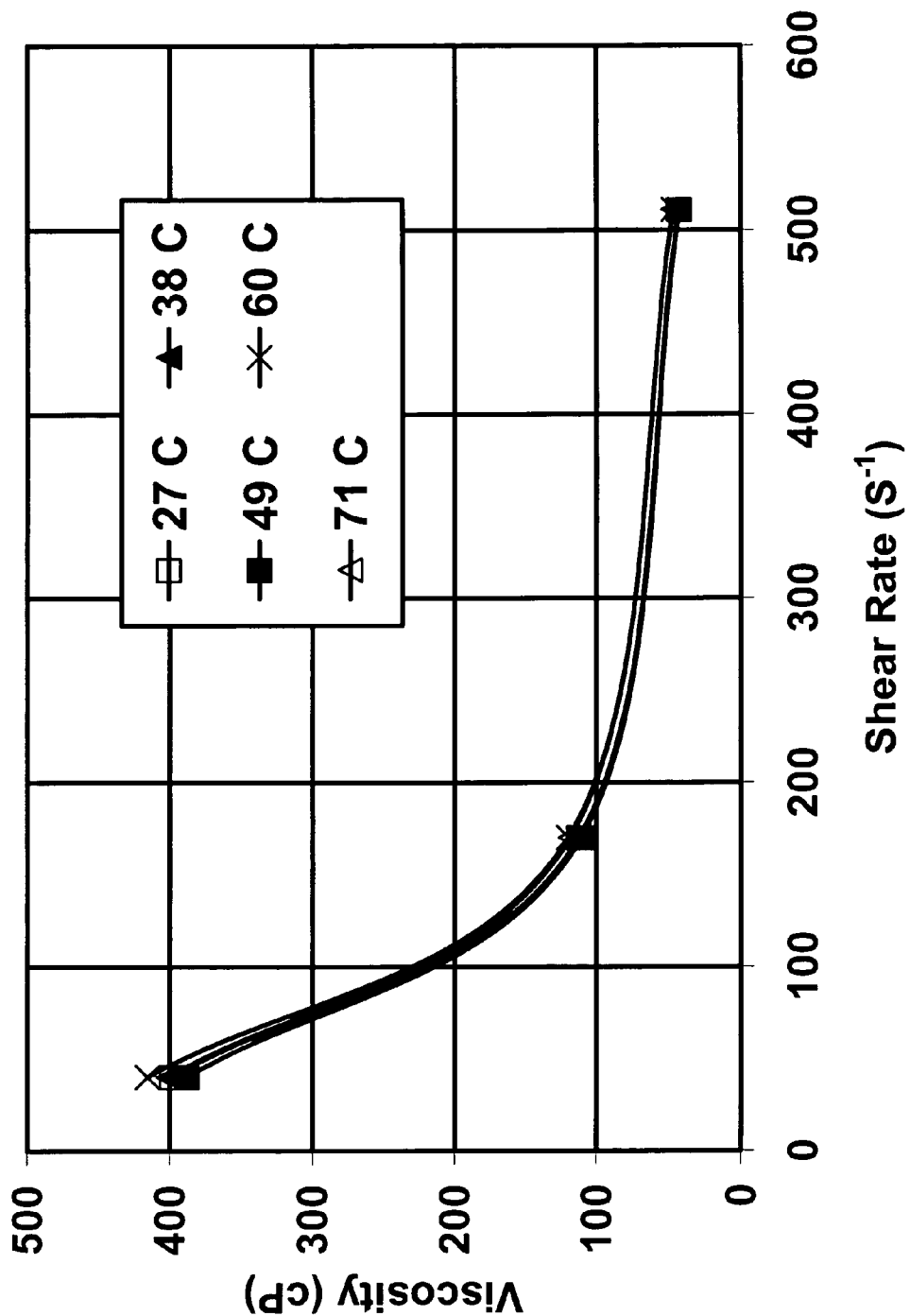
FIG. 9 shows the effect of shear rate on the viscosity of an exemplary gelled oil fluid of the invention at different temperatures.
Figure 10:
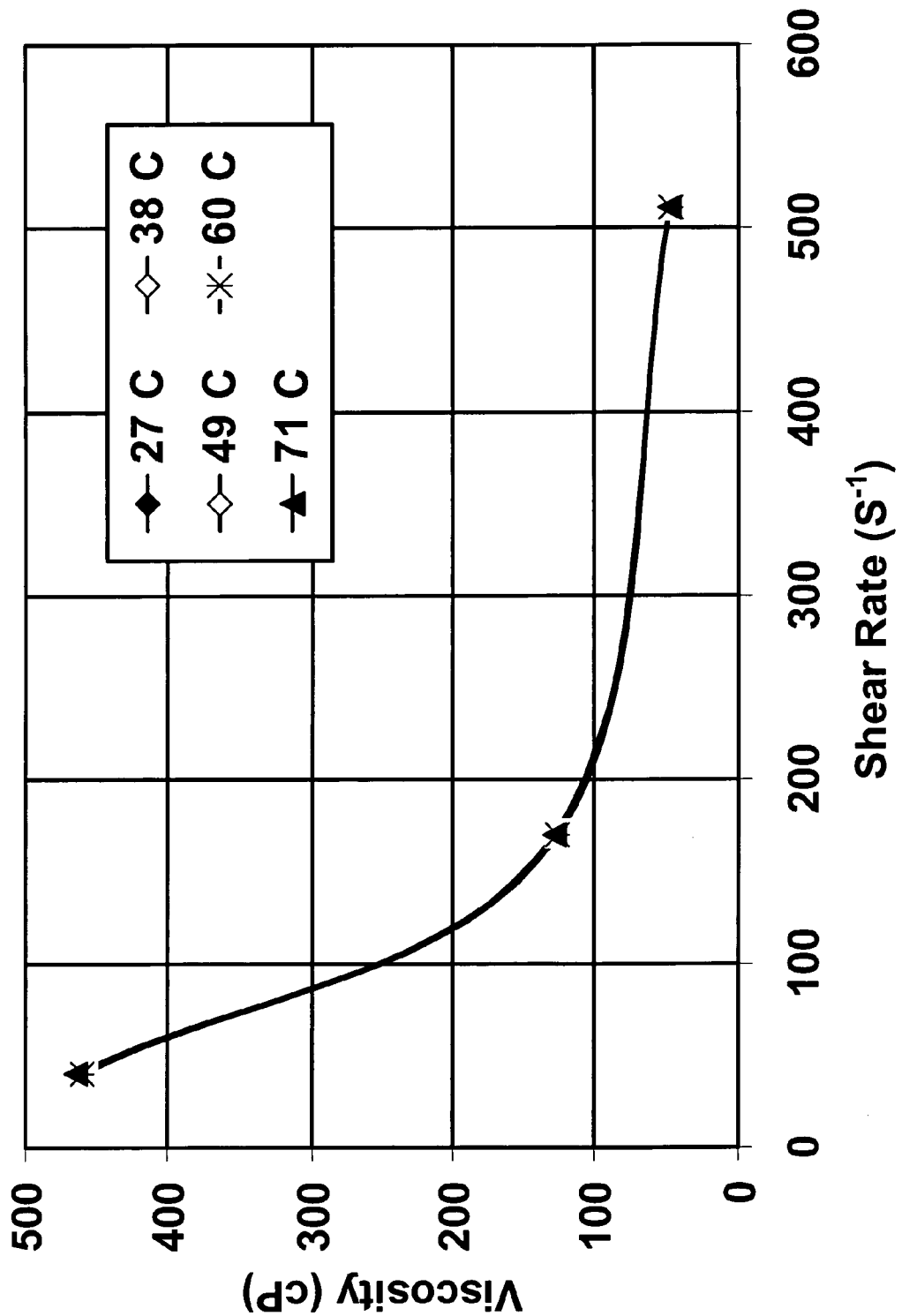
FIG. 10 shows the effect of shear rate on the viscosity of an exemplary gelled oil fluid of the invention at different temperatures.
Figure 11:
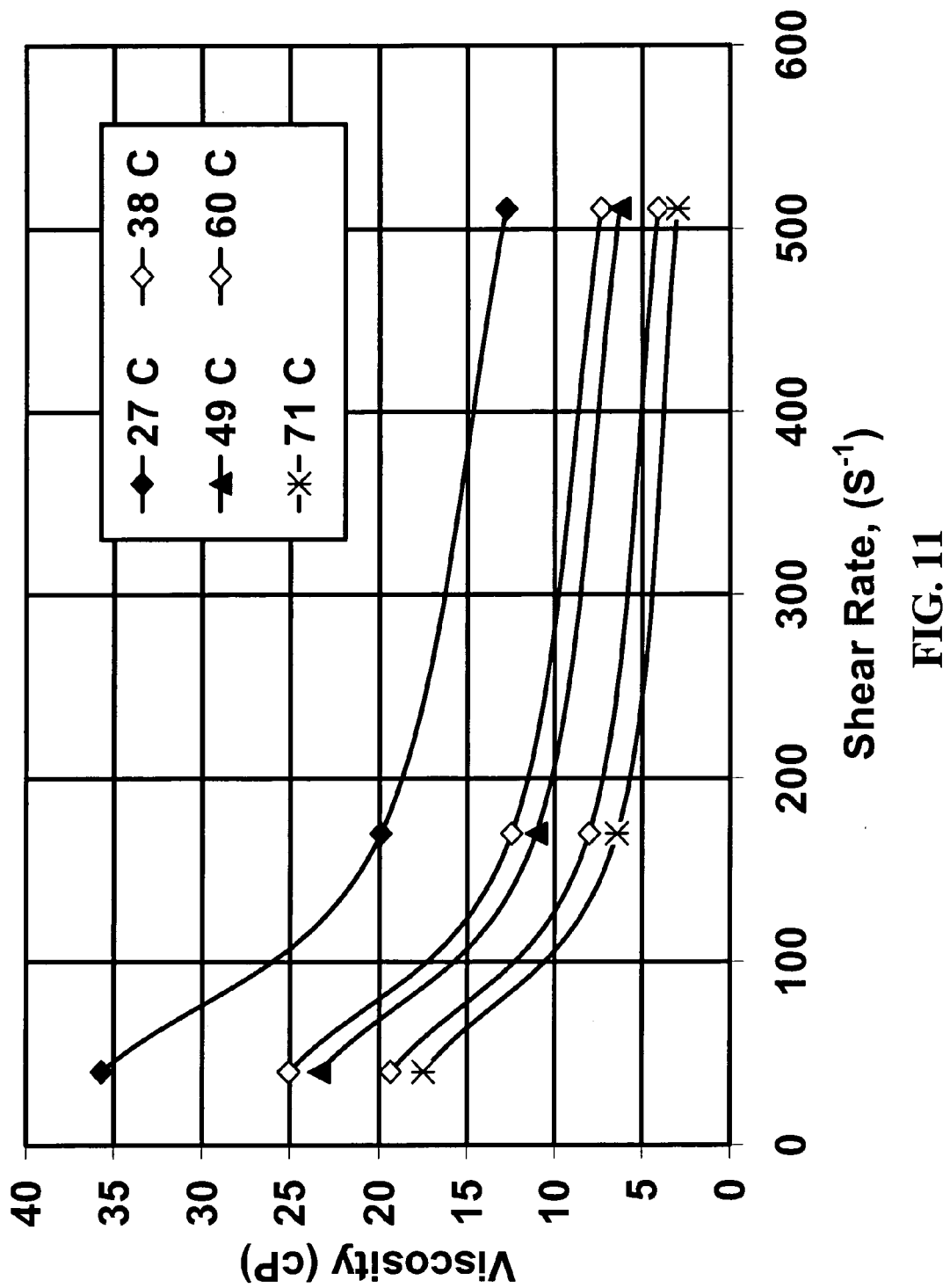
FIG. 11 shows the effect of shear rate on the viscosity of a prior art gelled oil fluid at different temperatures.

Similar experiments were conducted with the systems containing 5 ml/L S-1 (Fluids B, D, and F of Table 3). As expected of any viscoelastic fluids, the systems had lower viscosity at high shear (they were shear thinning). Viscosity was not affected at a given shear rate when the temperature was increased from room temperature up to 71° C. (160° F.). The results are shown in FIGS. 8-10.

Example 8

In the field, dilution with alcohol would improve operational simplicity, so the as-received gel-enhancing surfactant was diluted with methanol in a ratio of 1:1. The apparent viscosity of the new gelled oil system was determined at lower concentrations of gel-enhancing surfactant (the gel-enhancing surfactant S-IM is S-1 diluted 1:1 with methanol). The viscosities as a function of shear rate, temperature, and the amount of S-1M added are shown in Table 4; some of the results are shown graphically in FIGS. 11-14.

TABLE 4

| 5 ml/L PH-1 + 1.2 ml/L AL-1 + 0 S-1M | | | | 5 ml/L PH-1 + 1.2 ml/L AL-1 + 2 ml/L S-1M | | | |
|---|---|---|---|---|---|---|---|
| | Shear Rate | | | | Shear Rate | | |
| Temp | 40 | 170 | 511 | Temp | 40 | 170 | 511 |
| 27 C. | 36 | 20 | 13 | 27 C. | 271 | 84 | 35 |
| 38 C. | 25 | 12 | 7 | 38 C. | 259 | 81 | 33 |
| 49 C. | 23 | 11 | 6 | 49 C. | 256 | 81 | 33 |
| 60 C. | 19 | 8 | 4 | 60 C. | 253 | 81 | 34 |
| 71 C. | 17 | 6 | 3 | 71 C. | 220 | 85 | 42 |

| 5 ml/L PH-1 + 1.2 ml/L AL-1 + 4 ml/L S-1M | | | | 5 ml/L PH-1 + 1.2 ml/L AL-1 + 6 ml/L S-1M | | | |
|---|---|---|---|---|---|---|---|
| | Shear Rate | | | | Shear Rate | | |
| Temp | 40 | 170 | 511 | Temp | 40 | 170 | 511 |
| 27 C. | 340 | 103 | 42 | 27 C. | 358 | 107 | 43 |
| 38 C. | 356 | 108 | 44 | 38 C. | 348 | 106 | 43 |
| 49 C. | 373 | 112 | 45 | 49 C. | 360 | 110 | 45 |
| 60 C. | 382 | 115 | 46 | 60 C. | 362 | 115 | 48 |
| 71 C. | 389 | 119 | 49 | 71 C. | 370 | 121 | 52 |

| 5 ml/L PH-1 + 1.2 ml/L AL-1 + 8 ml/L S-1M | | | | 5 ml/L PH-1 + 1.2 ml/L AL-1 + 10 ml/L S-1M | | | |
|---|---|---|---|---|---|---|---|
| | Shear Rate | | | | Shear Rate | | |
| Temp | 40 | 170 | 511 | Temp | 40 | 170 | 511 |
| 27 C. | 300 | 94 | 39 | 27 C. | 380 | 118 | 49 |
| 38 C. | 303 | 96 | 40 | 38 C. | 382 | 119 | 49 |
| 49 C. | 308 | 99 | 41 | 49 C. | 394 | 124 | 52 |
| 60 C. | 313 | 104 | 45 | 60 C. | 400 | 132 | 56 |
| 71 C. | 317 | 108 | 47 | 71 C. | 393 | 132 | 57 |

Figure 12:
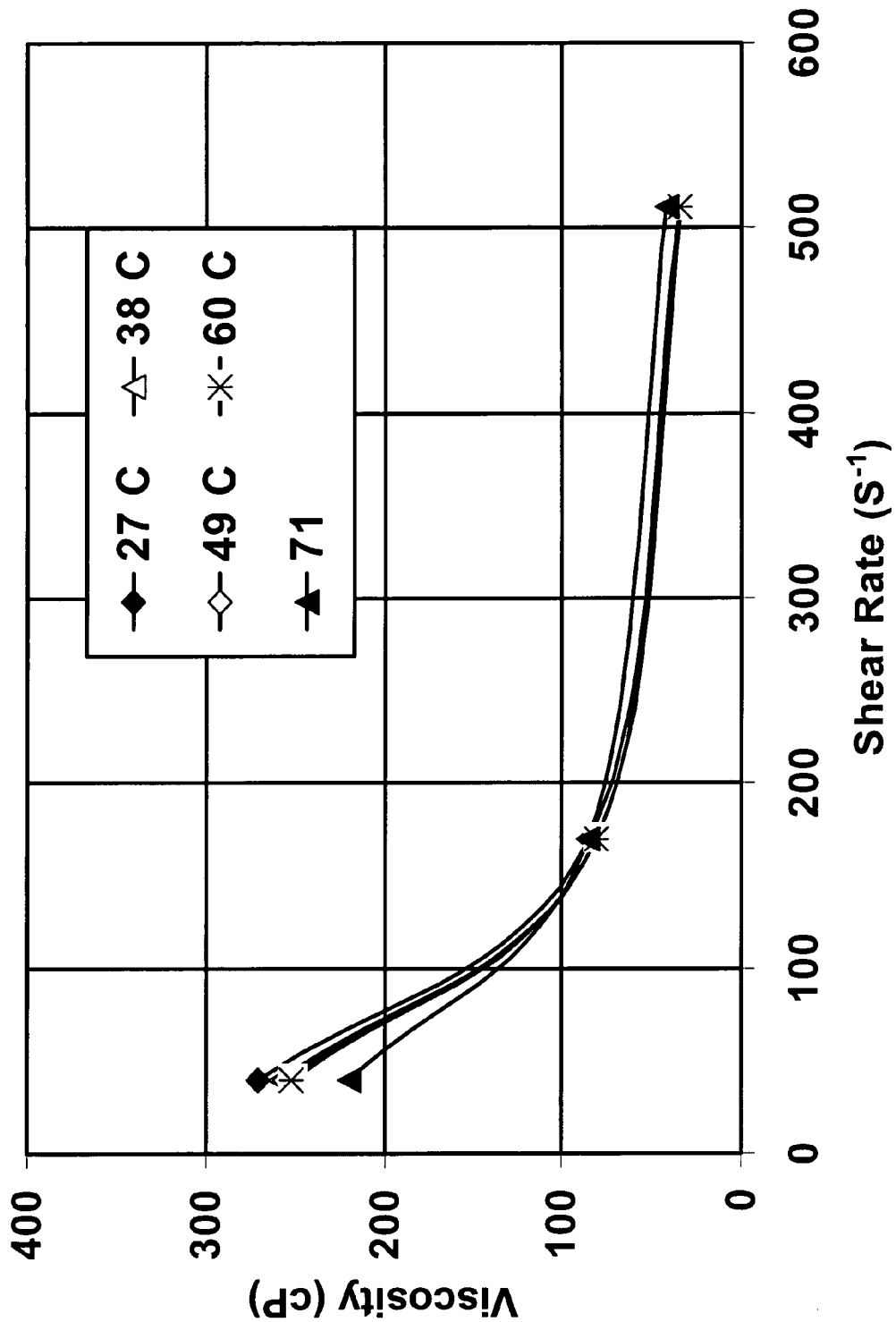
FIG. 12 shows the effect of shear rate on the viscosity of an exemplary gelled oil fluid of the invention containing methanol at different temperatures.
Figure 13:
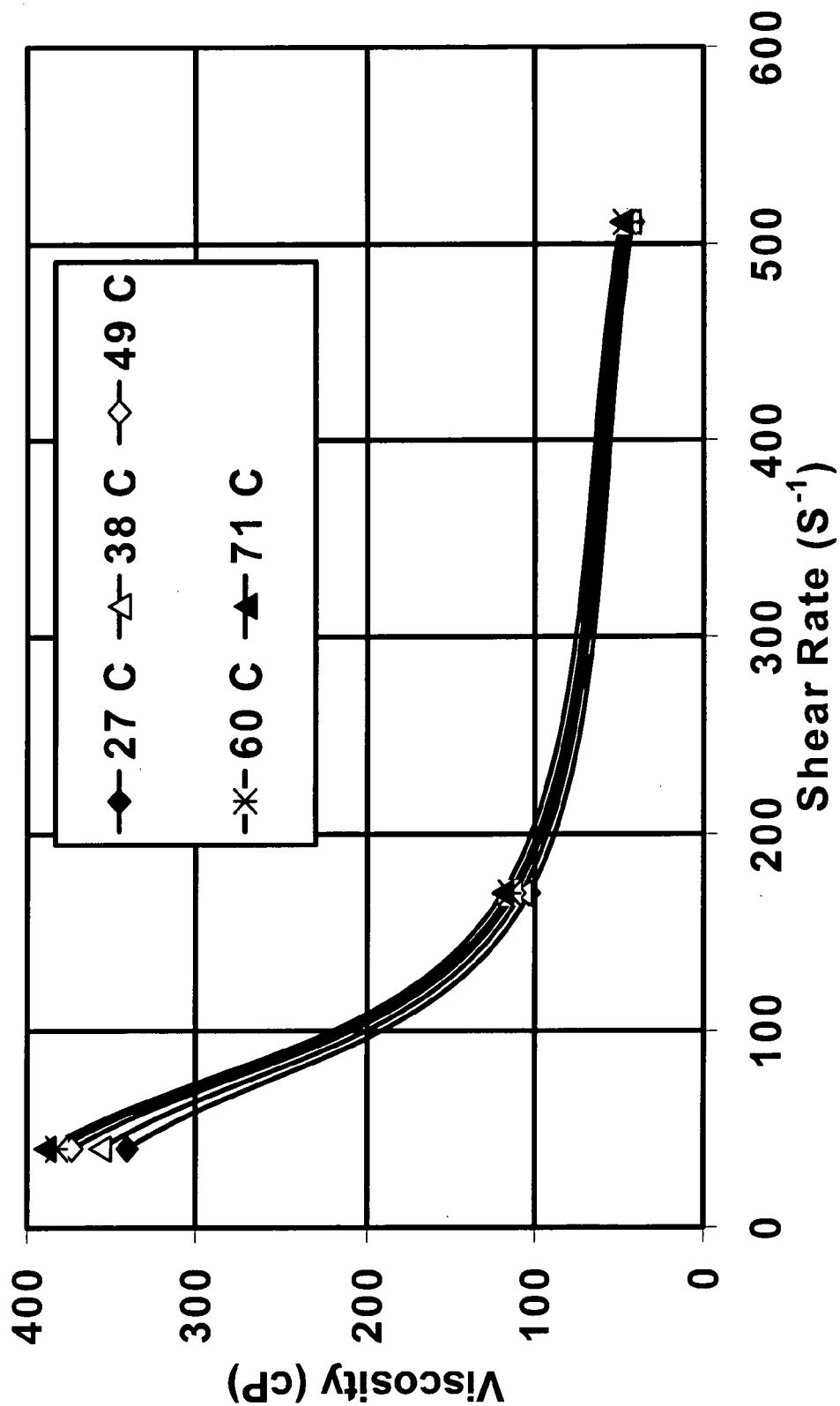
FIG. 13 shows the effect of shear rate on the viscosity of an exemplary gelled oil fluid of the invention containing methanol at different temperatures.
Figure 14:
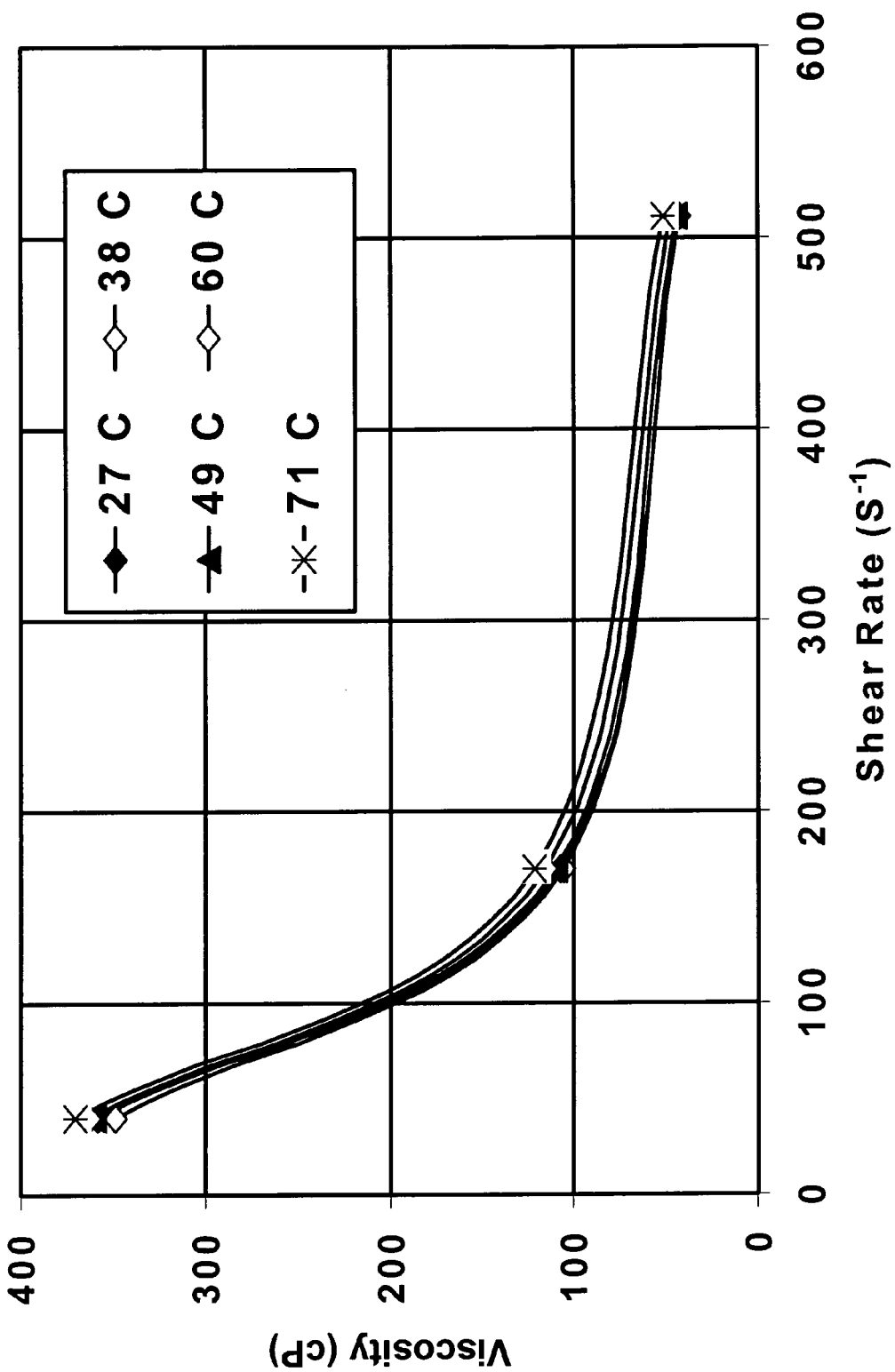
FIG. 14 shows the effect of shear rate on the viscosity of an exemplary gelled oil fluid of the invention containing methanol at different temperatures.

Comparison of the data with 10 ml/L S-1M (equivalent to 5 ml/L S-1) in Table 4 to the data with 5 ml/L S-1 (no methanol) in Table 3 (Fluid D) shows that the methanol had no deleterious effect on the viscosity. Consequently, although experiments have generally not been done to measure the viscosity with less than 5 ml/L S-1 (although see Table 17, below), it is believed that the experiments in Table 4 give an indication of what would be expected of V-GO systems having lower S-1 concentrations but no methanol. For example, the data show that even with 2 ml/L of S-IM (equivalent to 1 ml/L S-1) there was sufficient viscosity to suspend solids (FIG. 12). Although the viscosities were not measured, bench-top experiments with 1 or 2 ml/L S-1 also showed that good results were obtained at lower concentrations. With the higher concentrations of gel-enhancing surfactant (>5 ml/L S-1) in Table 4, the fluid was very viscous and viscoelastic and viscosity measurements were difficult, so there are no corresponding figures. Funnel viscosities were determined in those cases.

An interesting observation is that when S-1M was used in this fluid system, temperature had essentially no effect on the observed viscosities up to at least 71° C. (160° F.) at the concentrations of S-IM tested.

Example 9

Figure 15:
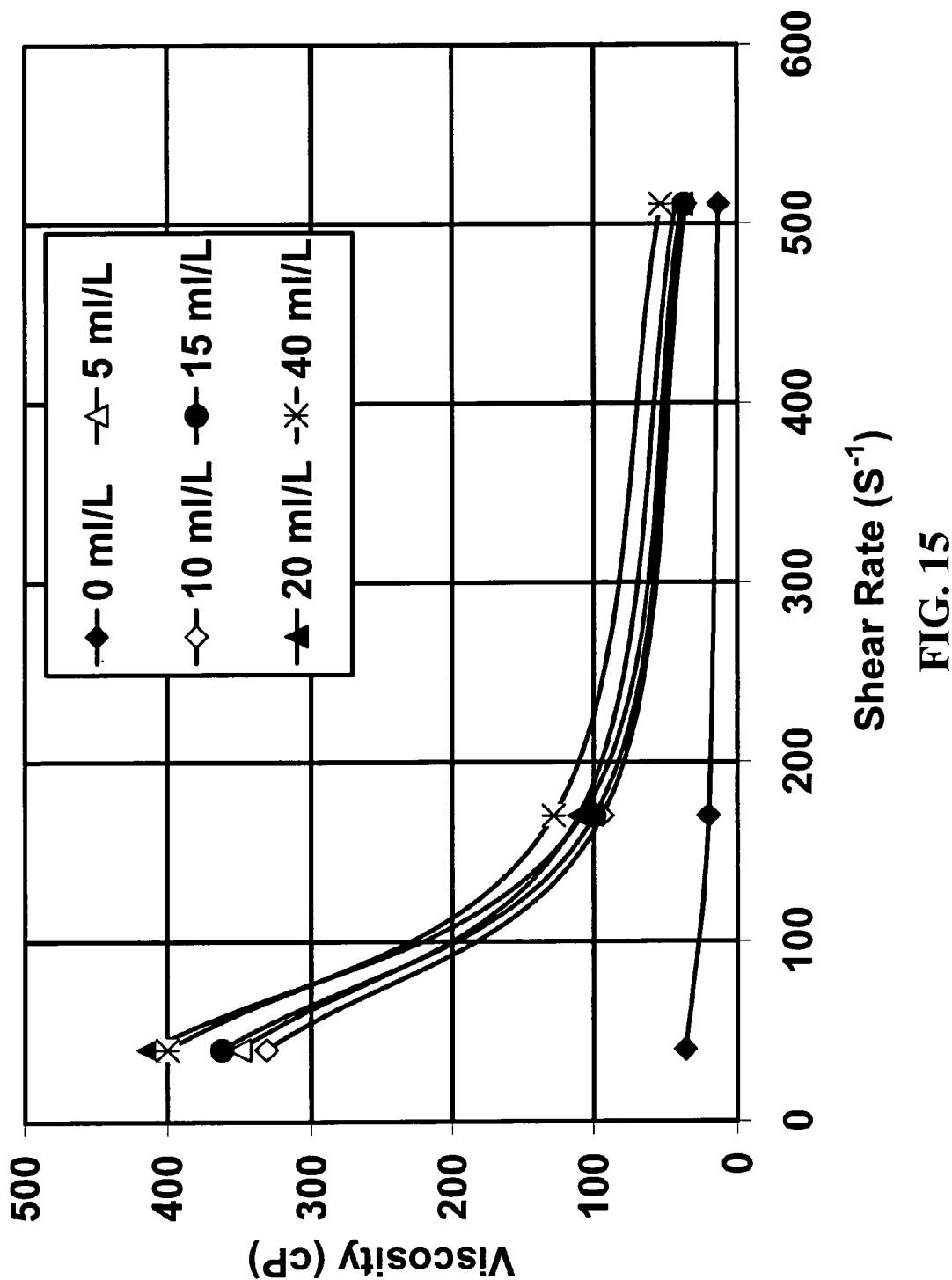
FIG. 15 shows the viscosity at room temperature of gelled oils containing varying amounts of a suitable gel-enhancing surfactant.

Experiments were done with higher concentrations of S-1, up to 40 ml/L (4 v/v %) at room temperature. The results are shown in Table 5 and FIG. 15. The measured viscosities appeared to be very similar to one another when at least 5 ml/L S-1 was added. This may have been due to bob climbing of the gel in the rheometer, or to other artifacts in the viscosity measurements of highly viscous fluids with this instrument (Fann 35). The data clearly show, however, that the viscosity and viscoelasticity of this system was maintained at S-1 concentrations of up to at least 40 ml/L, which is not believed to be the upper limit.

TABLE 5

5 ml/L PH-1 + 1.2 ml/L AL-1 and various S-1 concentrations

| | Shear Rate | | |
|---|---|---|---|
| S-1 Concentration | 40 | 170 | 511 |
| 0 ML/L | 36 | 20 | 13 |
| 5 | 350 | 110 | 43 |
| 10 | 331 | 94 | 36 |
| 15 | 362 | 99 | 37 |
| 20 | 413 | 108 | 39 |
| 40 | 400 | 128 | 54 |

Example 10

High concentrations of gel-enhancing surfactant were added to diesel, without the conventional phosphate and aluminum complex, and sheared. The resulting weak honey-like materials had viscosities similar to conventional gelled oil formulations without gel-enhancing surfactant, but they were not fluids had some solid viscoelastic. These fluids had some solid suspension characteristics, but much less than for V-GO fluids. Results at room temperature are shown below in Table 6.

TABLE 6

Diesel (solvent) + 0 ml/L PH-1 + 0 ml/L AL-1

| | Shear Rate | | |
|---|---|---|---|
| S-1 Concentration | 40 | 170 | 511 |
| 40 | 27 | 12 | 7 |
| 60 | 31 | 16 | 9 |
| 80 | 31 | 16 | 9 |

TABLE 6-continued

Diesel (solvent) + 0 ml/L PH-1 + 0 ml/L AL-1

| | Shear Rate | | |
|---|---|---|---|
| S-1 Concentration | 40 | 170 | 511 |
| 80 ml/L S-1 + 5 ml/L PH-1 + 1.2 ml/L AL-1 | 31 | 16 | 9 |

Addition of 5 m/L of PH-1 and 1.2 ml/L of AL-1 to this mixture did not provide the viscoelasticity and solids suspension characteristics of the V-GO system. This may have been due to the timing and/or of addition, as discussed elsewhere.

Example 11

Experiments were conducted at room temperature with the phosphate ester (PH-1), but without using the aluminum-based crosslinker (AL-1). The concentration of gel-enhancing surfactant was increased incrementally up to 80 ml/L (8 volume %). The viscosity did not increase appreciably even when the concentration of S-1 was very high, as shown in Table 7.

TABLE 7

Diesel (solvent) + 5 ml/L PH-1 + 0 ml/L AL-1

| | Shear Rate | | |
|---|---|---|---|
| S-1 Conc | 40 | 170 | 511 |
| 0 ML/L | 22 | 9 | 4 |
| 20 | 22 | 9 | 4 |
| 40 | 27 | 13 | 7 |
| 60 | 30 | 14 | 8 |
| 80 | 39 | 23 | 16 |
| 80, then add 1.2 ml/L AL-1 | 39 | 23 | 16 |

Furthermore, when the aluminum-based crosslinker (AL-1) was added at the end of the experiment (after adding PH-1 and then adding S-1 in increments and measuring the viscosity at several shear rates after each addition so that a considerable time had elapsed before the AL-1 was added) it can be seen that the viscosity was not substantially increased. Either the order of addition (as discussed in Example 3 above) or the amount or ratio of addition was deleterious in this experiment. Clearly, if field conditions will dictate an unusual order or timing or amount or ratio of addition, then laboratory experiments should be conducted to confirm that a good gel will be formed. With the particular combination used in this experiment, all three additives are needed to get the maximum viscosity and viscoelasticity required for solids suspension.

Example 12

The effect of commonly used additives was investigated at room temperature. The tests shown in Table 8 were performed with a relatively low concentration of S-1. The presence of the emulsified acids tested lowered the effectiveness of S-1 in this V-GO system. The emulsified acids (AE-1 and AE-2) were made with 623 ml/L of 31 weight percent HCl, 4 ml/L of a corrosion inhibitor (that is a mixture of formamide, low molecular weight alcohols, naphtha, mutual solvents, and quaternary ammonium compounds), 73 ml/L of field mixing water, 280 ml/L of diesel, and 20 ml/L of emulsifying agent. The emulsifying agent in EA-1 was about 41% isopropanol, about 31% cocoalkyl amines and acetates, about 1% of a dialkanolamine, and about 27% of tall oil acid diethanolamide. The emulsifying agent in EA-2 was about 56% isopropanol, about 3% water, and about 41% cocoalkyl amines and acetates. HCl lowered the effectiveness of this gel-enhancing surfactant system in this gelled oil. Acetic and formic acid also lower the viscosity, but to a lesser and approximately equal extent.

TABLE 8

| Fluid | Shear Rate | | |
|---|---|---|---|
| | 40 | 170 | 511 |
| V-GO = 5 ml/L PH-1 + 1.2 ml/L AL-1 + 2 ml/L S-1 | 320 | 93 | 36 |
| V-GO + 5% EA-1 | 15 | 5 | 2 |
| V-GO + 5% EA-2 | 15 | 5 | 2 |
| V-GO + 5% HCl | 15 | 5 | 2 |
| V-GO + 5% Formic acid | 48 | 34 | 26 |
| V-GO + 5% Acetic Acid | ~50 | ~35 | ~25 |

Example 13

The thermal stability of a V-GO fluid system was measured with a Fann 50 (high temperature, high pressure) rheometer with the following results:

TABLE 9

5 ml/L PH-1, 1.2 ml/L AL-1, 5 ml/L S-1

| Temperature (C.) | Viscosity (cP) at | | |
|---|---|---|---|
| | 1 sec−1 | 40 sec−1 | 170 sec−1 |
| 29 | 19,359 | 647 | 171 |
| 38 | 20,172 | 647 | 168 |
| 52 | 18,764 | 656 | 176 |
| 66 | 13,615 | 583 | 169 |
| 79 | 8,162 | 466 | 152 |
| 93 | 3,747 | 342 | 134 |
| 107 | 1,401 | 172 | 75 |
| 121 | 98 | 33 | 22 |
| 135 | 70 | 9 | 4 |

Figure 16:
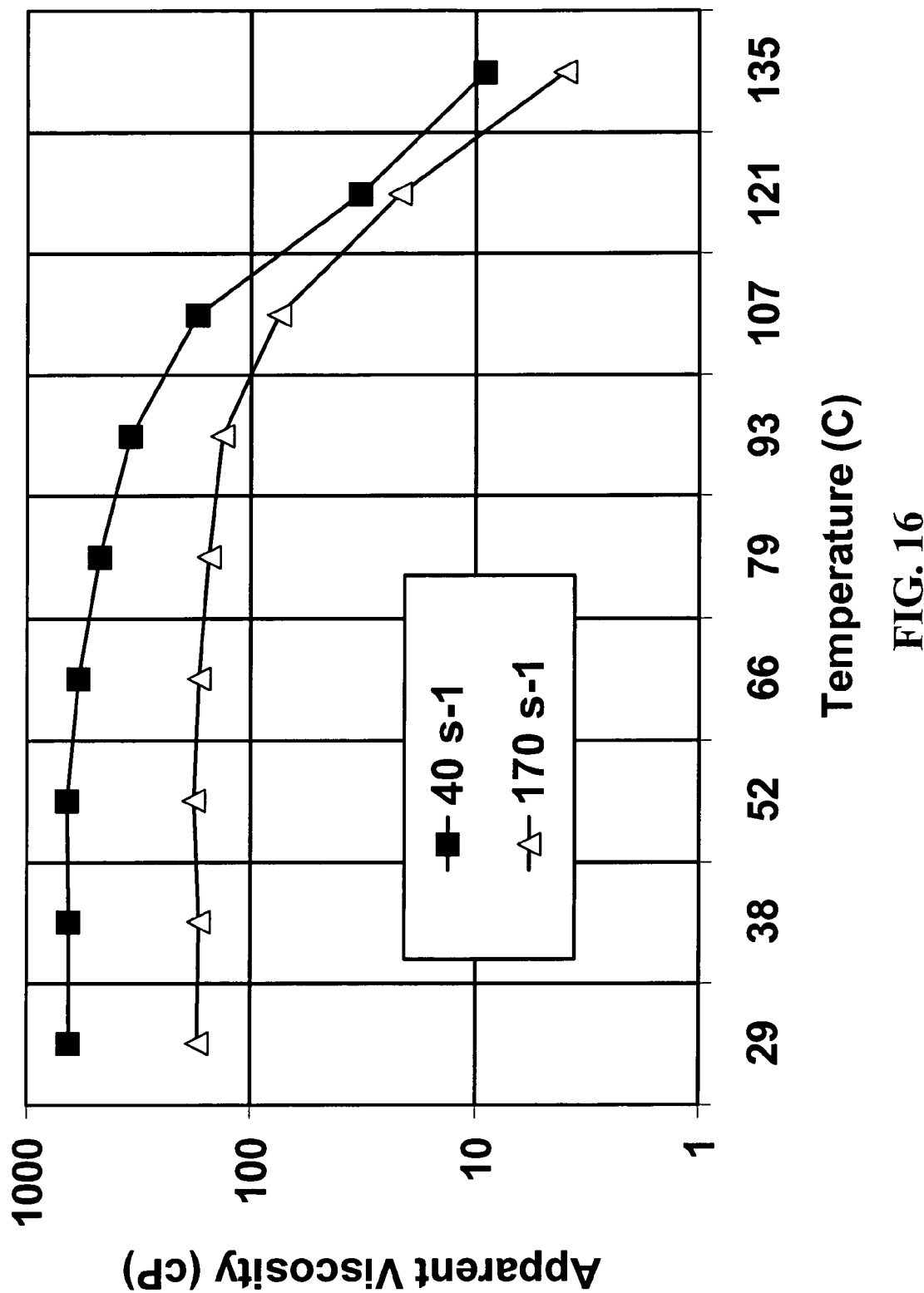
FIG. 16 shows the viscosity of an exemplary gelled oil of the invention as a function of temperature.

Those data are shown in FIG. 16 with the low shear viscosity not included because of the large difference in scales.

The thermal stability of a V-GO fluid system containing higher concentrations of PH-1 and AL-1 was measured with a Fann 50 rheometer with the results shown in Table 10. This fluid is suitable for CT cleanouts at temperatures up to 149° C. (300° F.) and may be used at up to 135° C. (275° F.) for hydraulic fracturing applications.

TABLE 10

8 ml/L PH-1, 2.0 ml/L AL-1, 5 ml/L S-1

| Temperature (C.) | Viscosity (cP) at | | |
|---|---|---|---|
| | 1 s−1 | 40 s−1 | 170 s−1 |
| 29 | 22,118 | 837 | 232 |
| 38 | 24,874 | 895 | 243 |
| 52 | 25,894 | 945 | 258 |
| 66 | 24,496 | 997 | 284 |
| 79 | 19,544 | 941 | 286 |
| 93 | 14,756 | 770 | 242 |
| 107 | 7,788 | 541 | 190 |
| 121 | 940 | 233 | 135 |

TABLE 10-continued 8 ml/L PH-1, 2.0 ml/L AL-1, 5 ml/L S-1

| Temperature (C.) | Viscosity (cP) at | | |
|---|---|---|---|
| | 1 s−1 | 40 s−1 | 170 s−1 |
| 135 | 163 | 63 | 43 |
| 149 | 194 | 24 | 11 |

Figure 17:
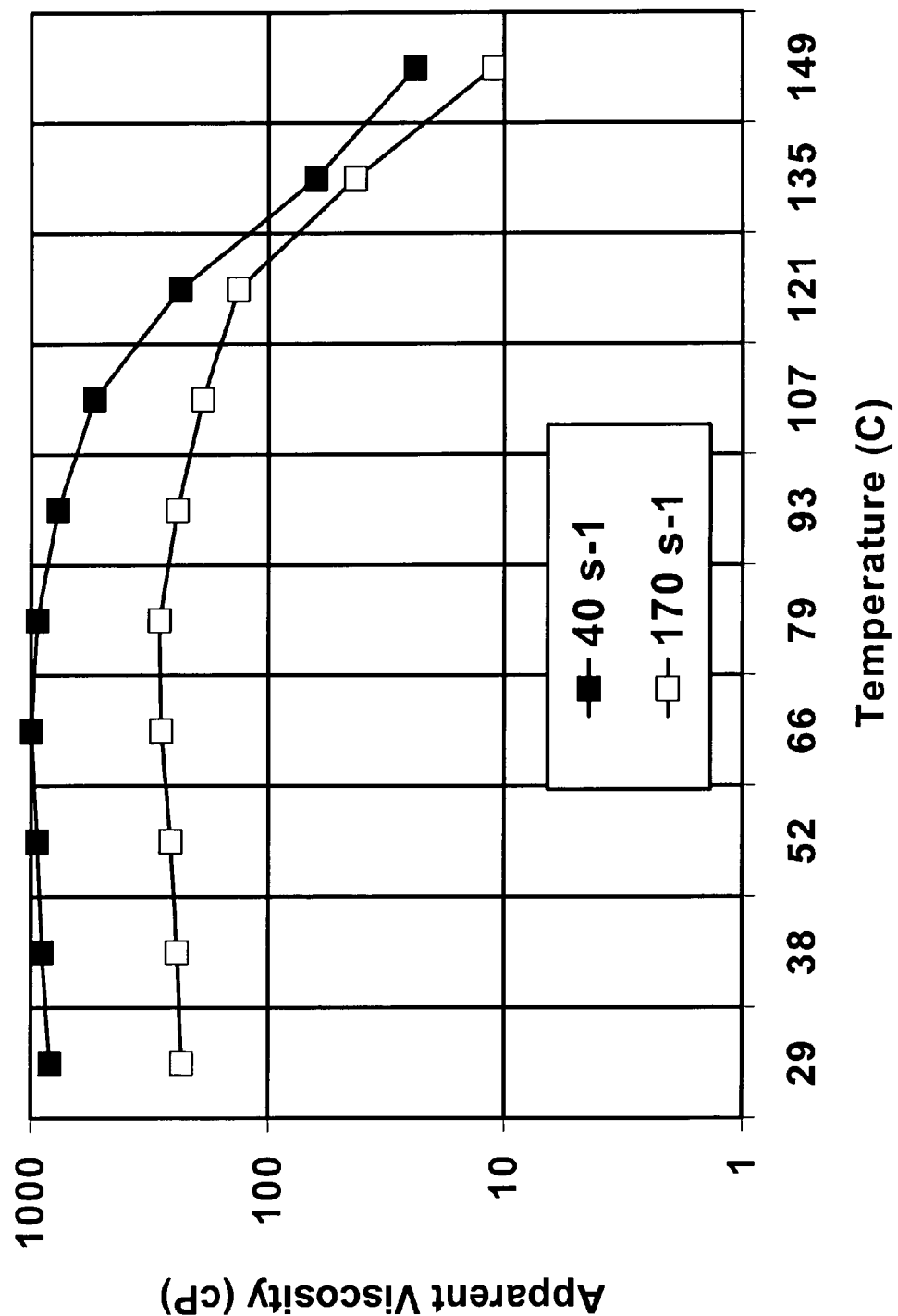
FIG. 17 shows the viscosity of an exemplary gelled oil of the invention as a function of temperature.

Those data are shown in FIG. 17 with the low shear viscosity not included because of the large difference in scales.

The thermal stability of a V-GO fluid system containing an even higher concentration of AL-1 was measured with a Fann 50 rheometer with the results shown in Table 11. Viscosities were not measured above 149° C. (300° F.) for such systems containing diesel for laboratory safety reasons.

TABLE 11

8 ml/L PH-1 and 2.4 ml/L AL-1

| Temperature (C.) | Viscosity (cP) at | | |
|---|---|---|---|
| | 1 s−1 | 40 s−1 | 170 s−1 |
| 29 | 36,304 | 1235 | 328 |
| 38 | 41,529 | 1238 | 312 |
| 52 | 37,580 | 1183 | 305 |
| 66 | 37,417 | 1232 | 323 |
| 79 | 20,194 | 1086 | 345 |
| 93 | 9,350 | 908 | 364 |
| 107 | 6,139 | 592 | 236 |
| 121 | 2,436 | 351 | 164 |
| 135 | 547 | 175 | 112 |
| 149 | 132 | 49 | 32 |

Figure 18:
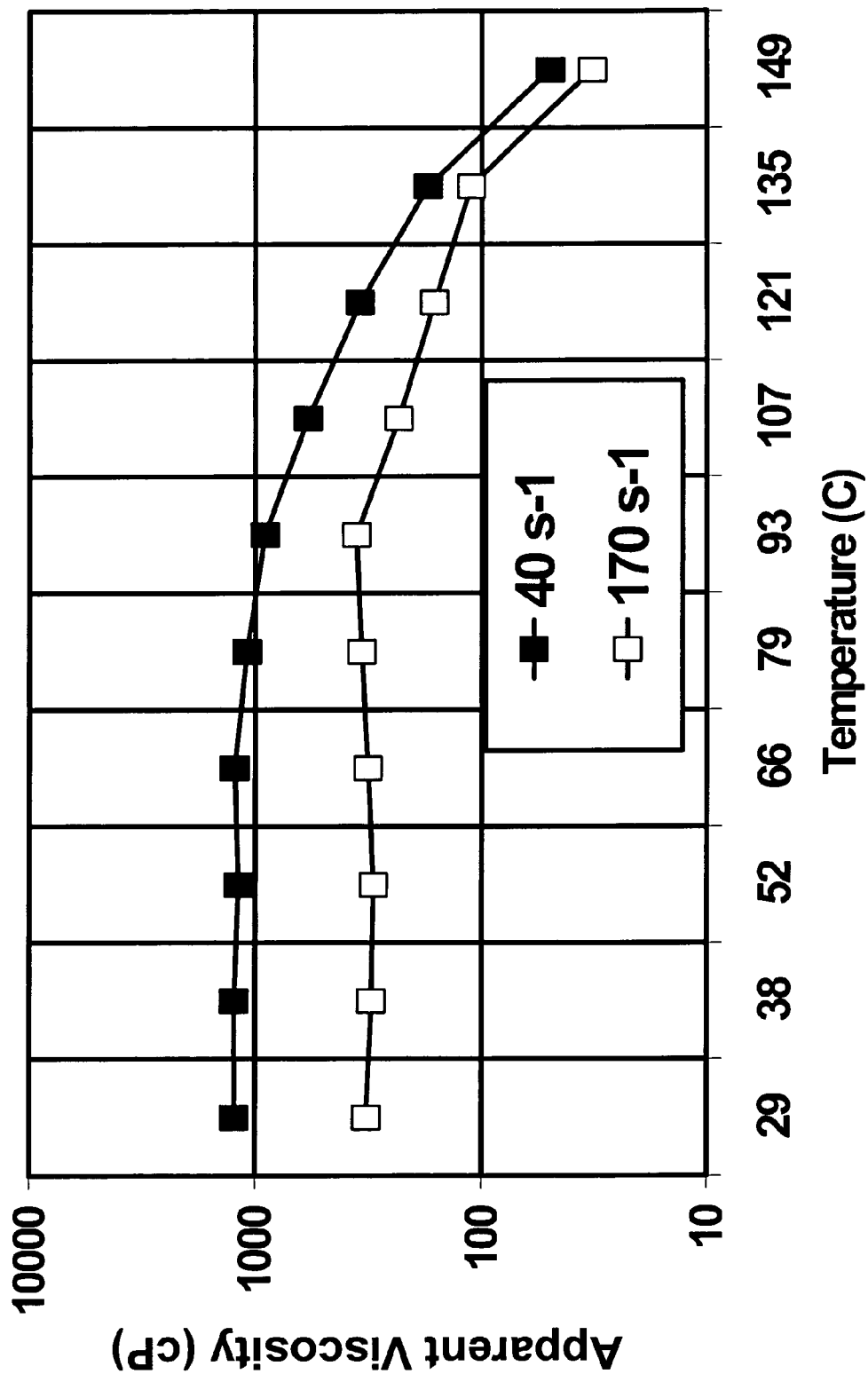
FIG. 18 shows the viscosity of an exemplary gelled oil of the invention as a function of temperature.

Those data are shown in FIG. 18 with the low shear viscosity not included because of the large difference in scales.

Example 14

Experiments with 5 ml/L PH-1, 1.2 ml/L AL-1 and 5 ml/L S-1 in a liquid paraffin mineral oil containing a small amount of isopropyl palmitate showed that a good V-GO was made with this base oil.

Example 15

Figure 19:
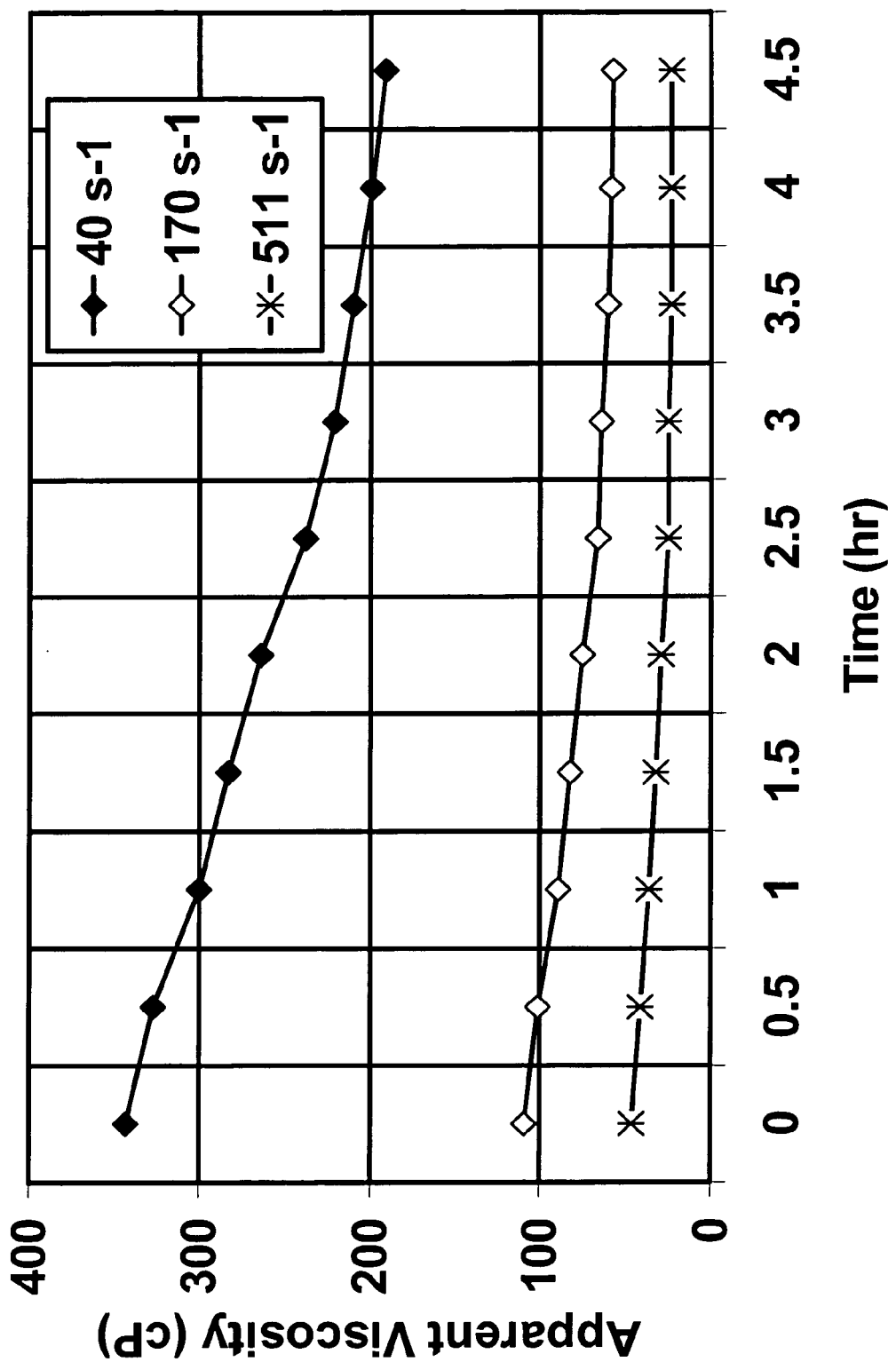
FIG. 19 shows the decrease in viscosity of an exemplary gelled oil of the invention as a function of time at 71° C.

Water based systems containing viscoelastic surfactant fluids do not degrade over time except at very high temperatures, or at very low or very high pH's. On the other hand, examination of the viscosity of many V-GO systems over a period of time showed that at a sufficient temperature for each formulation the systems break by themselves and so cleanup is not a concern. The rate of break is believed to increase with increasing temperature. An example is shown in FIG. 19, for a fluid containing 5 ml/L PH-1, 1.2 ml/L AL-1 and 4 ml/L S-1 in diesel. This result is expected to be the same with or without methanol.

Example 16

Figure 20:
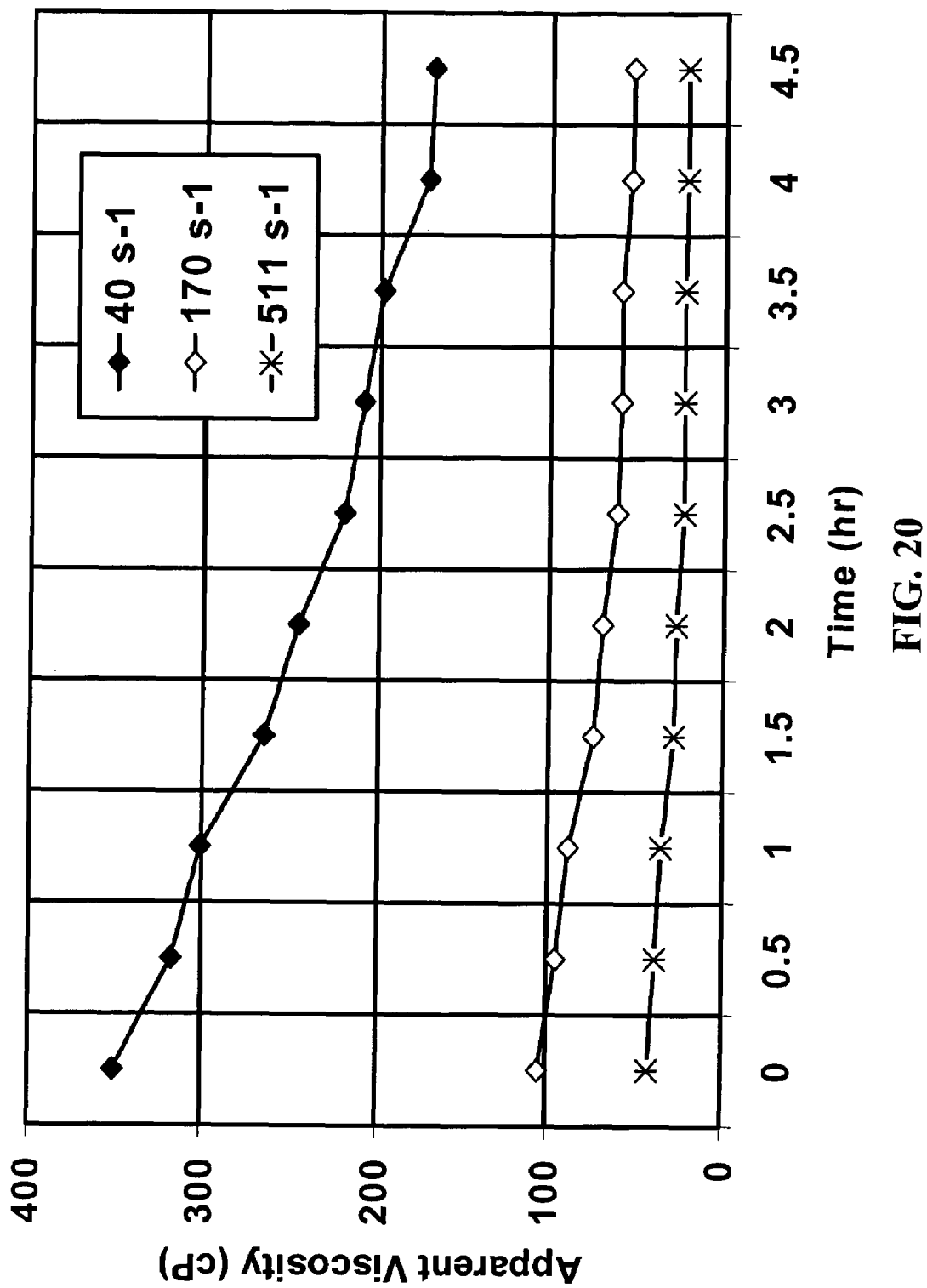
FIG. 20 shows the effect of $Na_2CO_3$ on the viscosity of an exemplary gelled oil of the invention as a function of time at 71° C.

Na$_2$CO$_3$ and sodium acetate are commonly used to break conventional prior art gelled oils. These materials have been found to demonstrate better performance as breakers of conventional prior art gelled oils in the presence of the small amounts of water normally present in conventional prior art gelled oil formulations. Na$_2$CO$_3$ is normally used in conventional gelled oils at a concentration of about 1.2 to about 3.6 g per liter (about 10 to about 30 pounds per thousand gallons); in the experiment shown in FIG. 20, 1.2 g/L (10 pounds per thousand gallons) was used. Comparison to the data in FIG. 19 shows that $Na_2CO_3$ had little effect on the stability of the V-GO system at that concentration. However, in other experiments, not shown, this concentration of this breaker was effective for other V-GO formulations and at higher temperatures. On the other hand, we have found that sodium acetate acts as a breaker at a concentration of about 0.12 to about 1.2, preferably about 0.36 to about 0.72, g/L (about 1 to about 10, preferably about 3 to about 6, pounds (as the trihydrate) per thousand gallons) for this V-GO at this low temperature. As usual with breakers, more breaker is needed at lower temperatures and less at higher temperatures. This result is expected to be the same with or without methanol.

The V-GO fluid systems were also broken completely and very rapidly (known as a flash break) by using either a mixture of poly-(oxy-1,2-ethanediyl) nonyl phenol and dodecylbenzene sulfonic acid in methanol or a mixture of dodecylbenzene sulfonic acid, cocamidopropylamine oxide and linear/branched $C_{11}$ alcohol ethoxylate (having about 11 ethylene oxide units). These materials were added after gelling (after the addition of the surfactant. Such a procedure (a flash break) is used if there is a problem and a consequent need to break the system immediately.

Example 17

Figure 21:
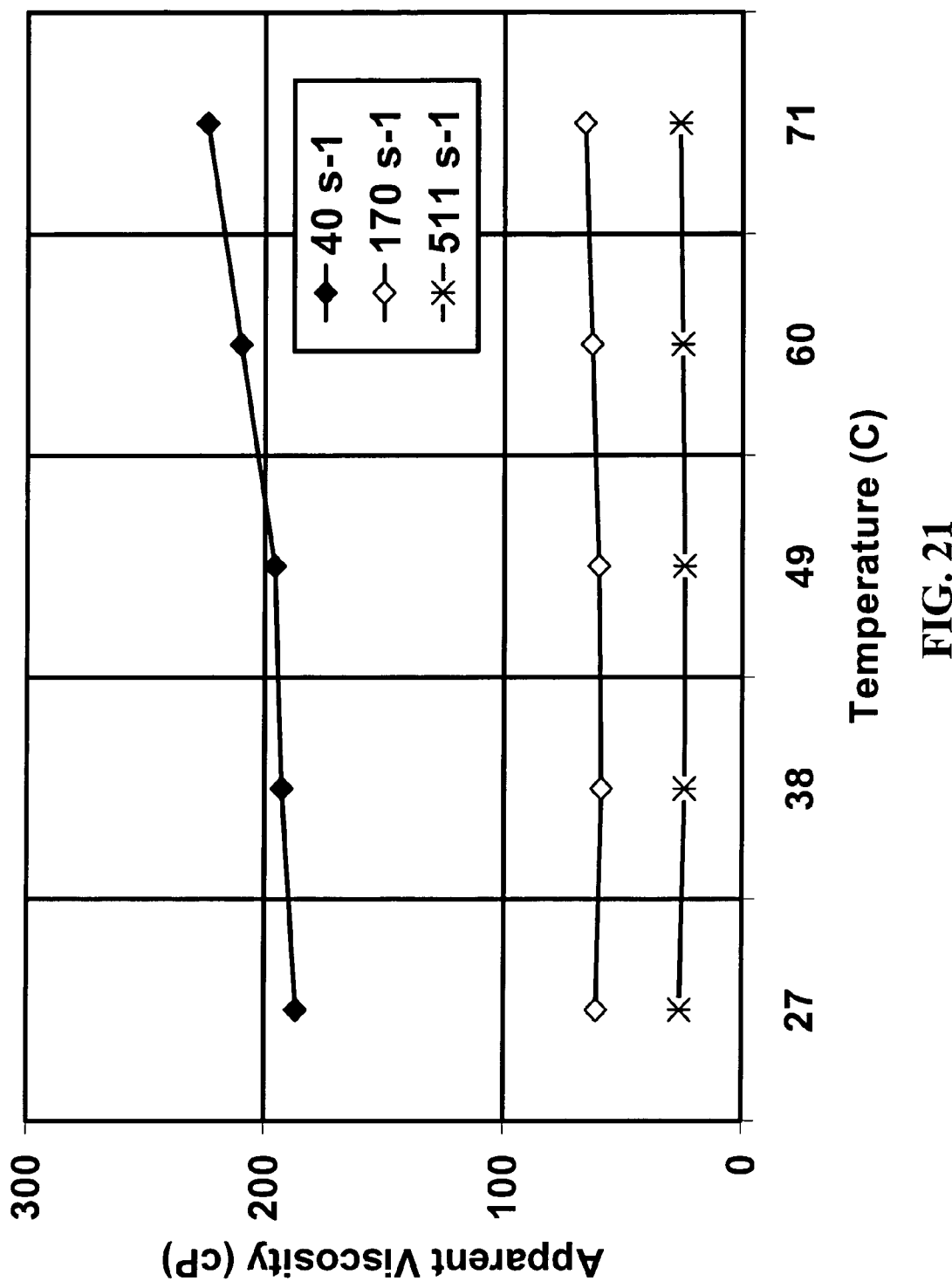
FIG. 21 shows the viscosity of an exemplary gelled oil of the invention as a function of temperature.

We have also looked at the effect of other gel-enhancing surfactants such as a mixture of about 29% oleoylamidopropyl dimethyl betaine, about 4% NaCl, and about 3% sodium dodecylbenzene sulfonate in a solvent of DPM glycol ether, glycerol, propan-1,2-diol and water (denoted S-2). This zwitterionic gel-enhancing surfactant also showed very good gellation properties, similar to S-1 systems, as shown in FIG. 21. As determined in other experiments, not shown, S-2 was also effective without the sodium dodecylbenzene sulfonate.

This fluid was made at 27° C. (80° F.) and the viscosity was measured at several shear rates as the temperature was increased. The data show that the viscosity increased with time and/or temperature and/or shearing. Although the fluids made in Examples 15 and 16 showed some decrease in viscosity with time, it is not uncommon that conventional gelled oils increase in viscosity with time and/or temperature and/or shearing, as was seen in this example for a V-GO. Viscosity is sometimes seen to increase with time, and/or temperature and/or shearing, especially if the full initial viscosity has not been achieved before the beginning of the rheology experiment. This fluid property can be used to advantage. When initial viscosities are lower, initial friction pressures are lower if there is a delay in achieving full viscosity; this saves hydraulic horsepower during pumping, especially through coiled tubing. The savings are in addition to the savings due to the shear thinning properties of the fluid systems. Also important, however, is that, over very long times, GO's and V-GO's will generally lose their viscosity without the need for external breakers, as was shown by the data in Example 15. High temperatures and shearing favor the break.

Example 18

Experiments with cationic gel-enhancing surfactants such as quaternary ammonium compounds (Q1 and Q2) showed that they also provide viscosity and viscoelasticity to the system as shown in Table 12. These V-GO's were made with 5 ml/L PH-1 and 1.2 ml/L AL-1 in diesel. Q1 was about 60% (Z)-13-docosenyl-N-N-bis (2-hydroxyethyl) methyl ammonium chloride in water, isopropanol and propan-1,2-diol. Q2 was a mixture of about 54% of a mixture of (Z)-13-docosenyl-N-N-bis(2-hydroxyethyl) methyl ammonium chloride and C12-C22 alkyl bis (2-hydroxyethyl) methyl ammonium chlorides and 5% sodium salicylate in isopropanol and water. Preparation of the fluid in a kitchen blender (long period of low shear) or Waring blender (high shear for shorter period) did not make any difference in the nature of the resulting V-GO fluid.

TABLE 12

| V-GO + 5 ml/L Q1 | Viscosity (cP) at 27 C. | | |
|---|---|---|---|
| Shear Rates | 40 s−1 | 170 s−1 | 511 s−1 |
| Kitchen Blender | 222 | 67 | 27 |
| Waring Blender | 210 | 65 | 26 |
| V-GO + 5 ml/L Q2 | Viscosity (cP) at 27 C. | | |
| Shear Rates | 40 s−1 | 170 s−1 | 511 s−1 |
| Kitchen Blender | 232 | 73 | 30 |
| Waring Blender | 228 | 70 | 27 |

Example 19

Ethoxylated higher alcohols (non-ionic surfactants) were also used to increase the viscosity of GO systems. The V-GO was made with 5 ml/L PH-1 and 1.2 ml/L AL-1 in diesel. The ethoxylated higher alcohol was a mixture of about 10% ethoxylated $C_{12}$-$C_{15}$ linear alcohols and 20% ethoxylated $C_{11}$ linear/branched alcohols, 20% isopropanol, 20% 2-butoxyethanol and 30% water. The resulting gel was viscous but not highly elastic, as shown in Table 13; the amounts shown are for the as-received material.

TABLE 13

| | Viscosity (cP) at 27 C. | | |
|---|---|---|---|
| Non-ionic surfactant | 40 s−1 | 170 s−1 | 511 s−1 |
| 5 ml/L | 212 | 76 | 35 |
| 10 ml/L | 241 | 79 | 34 |
| 15 ml/L | 251 | 77 | 32 |

Example 20

Initial tests showed that the anionic surfactant oleic acid increased the viscosity of the system and produced some solids carrying capability; however, the system was viscous, as shown in Table 14, but not viscoelastic. The lip test is a procedure in which a gel is poured very slowly from one container to another. The fluid demonstrates a "lip" if, when the pouring is stopped part way through and the initial container is slowly tipped back up, the fluid will climb back into the initial container because of its elasticity. This is a simple way to observe whether a fluid is viscoelastic ("has a lip" or "passes the lip test"), or is merely viscous (no lip). Viscoelastic fluids are much better at suspending solids, such as sand or proppant, than are merely viscous fluids having the same viscosity. A fluid made with the anionic surfactant did not give a positive lip test so the fluid system was not a V-GO. The initial fluid was made with 5 ml/L PH-1 and 1.2 ml/L AL-1 in diesel. When sodium hydroxide was added to this gelled oil containing oleic acid, the system developed a jelly-like appearance, due to the creation of sodium oleate soap, but the system was very unstable and quickly broke back to oil and soap. The broken fluid was a good foamer.

TABLE 14

| Anionic Surfactant | Viscosity (cP) at 27 C. | | |
|---|---|---|---|
| | 40 s−1 | 170 s−1 | 511 s−1 |
| 5 ml/L | 176 | 95 | 59 |

Example 21

A different gelled oil was tested. The additives were PH-1, aluminum complex AL-2 (10% polyaluminumhydroxychloride-sulfate in water) and a base, B-1 (15% sodium acetate in water). In a typical experiment, an activator solution was first made by mixing AL-2 and B-1 in a ratio of 5:1. In the experiments shown in Table 15, various concentrations of this activator were then added to 6 ml/L of PH-1 in diesel, the mixtures were blended, and the rheologic properties were determined at room temperature. Addition of S-1 was shown to increase the low shear viscosity, which is important for sand cleanout and proppant suspension. The high shear viscosity remained more or less the same, indicating that the fluids would not be difficult to pump, even though they have high viscosities. Although further experiments have not been performed, it is believed that V-GO fluid systems may also be made with any other aluminum complex (e.g. aluminum octanoate, phosphated alcohol, etc.) known to be suitable for the preparation of gelled oils. In the presence of S-1, all these fluids had a better lip and better solid suspension capability than without S-1.

TABLE 15

| | No S-1 | | | 5 ml/L S-1 | | |
|---|---|---|---|---|---|---|
| Activator (1:5 AL-2 and B-1) | 40 | 170 | 511 | 40 | 170 | 511 |
| 6:4 | 666 | 197 | 78 | 946 | 247 | 89 |
| 6:3.5 | 543 | 182 | 79 | 762 | 199 | 85 |
| 6:3 | 370 | 123 | 53 | 654 | 168 | 60 |
| 5:3 | No gel | | | No gel | | |

Example 22

Experiments were performed with lower concentrations of PH-1 and/or AL-1. V-GO fluid systems were made with 1.2 ml/L AL-1 and 5 ml/L S-1 or less, but with 4 ml/L PH-1 instead of the 5 ml/L more commonly used with these amounts of the other components. The results, shown in Table 16, indicate how dramatically the S-1 increased the viscosity, especially at low shear. A few experiments with lower amounts of AL-1 (and lower PH-1 and no S-1) showed that with the lower amounts of AL-1 and PH-1 the viscosities were lower but still appreciable.

TABLE 16

Vary AL-1 and S-1 Concentration, 4 ml/L PH-1

| | | Viscosity (cP) at | | |
|---|---|---|---|---|
| ml/L AL-1 | ml/L S-1 | 40 s−1 | 170 s−1 | 511 s−1 |
| 1.1 | 0 | 109 | 60 | 38 |
| 1.15 | 0 | 156 | 72 | 40 |
| 1.2 | 0 | 220 | 96 | 51 |
| 1.2 | 1 | 483 | 135 | 51 |
| 1.2 | 2 | 584 | 169 | 66 |
| 1.2 | 5 | 684 | 191 | 72 |

V-GO fluid systems can also be made from 3 ml/L PH-1, 0.9 ml/L AL-1 and S-1. It is believed that with appropriate adjustment of the concentrations, V-GO fluid systems useful for certain purposes may be made with as little as about 2 ml/L PH-1.

Example 23

The concentration of S-1 was varied with the more common formulation of 5 ml/L PH-1 and 1.2 ml/L AL-1.

TABLE 17

Vary S-1 Concentration, 5 ml/L PH-1, 1.2 ml/L AL-1

| | Viscosity (cP) at 27 C. | | |
|---|---|---|---|
| ml/L S-1 | 40 s−1 | 170 s−1 | 511 s−1 |
| 0 | 164 | 74 | 41 |
| 1 | 377 | 108 | 41 |
| 2 | 412 | 111 | 41 |
| 3 | 367 | 100 | 37 |
| 5 | 381 | 103 | 38 |
| 10 | 427 | 121 | 46 |

These formulations also gave good viscosities, as shown in Table 17, and clearly demonstrate the effectiveness of S-1 at increasing the viscosities, especially at low shear.

Example 24

Figure 22:
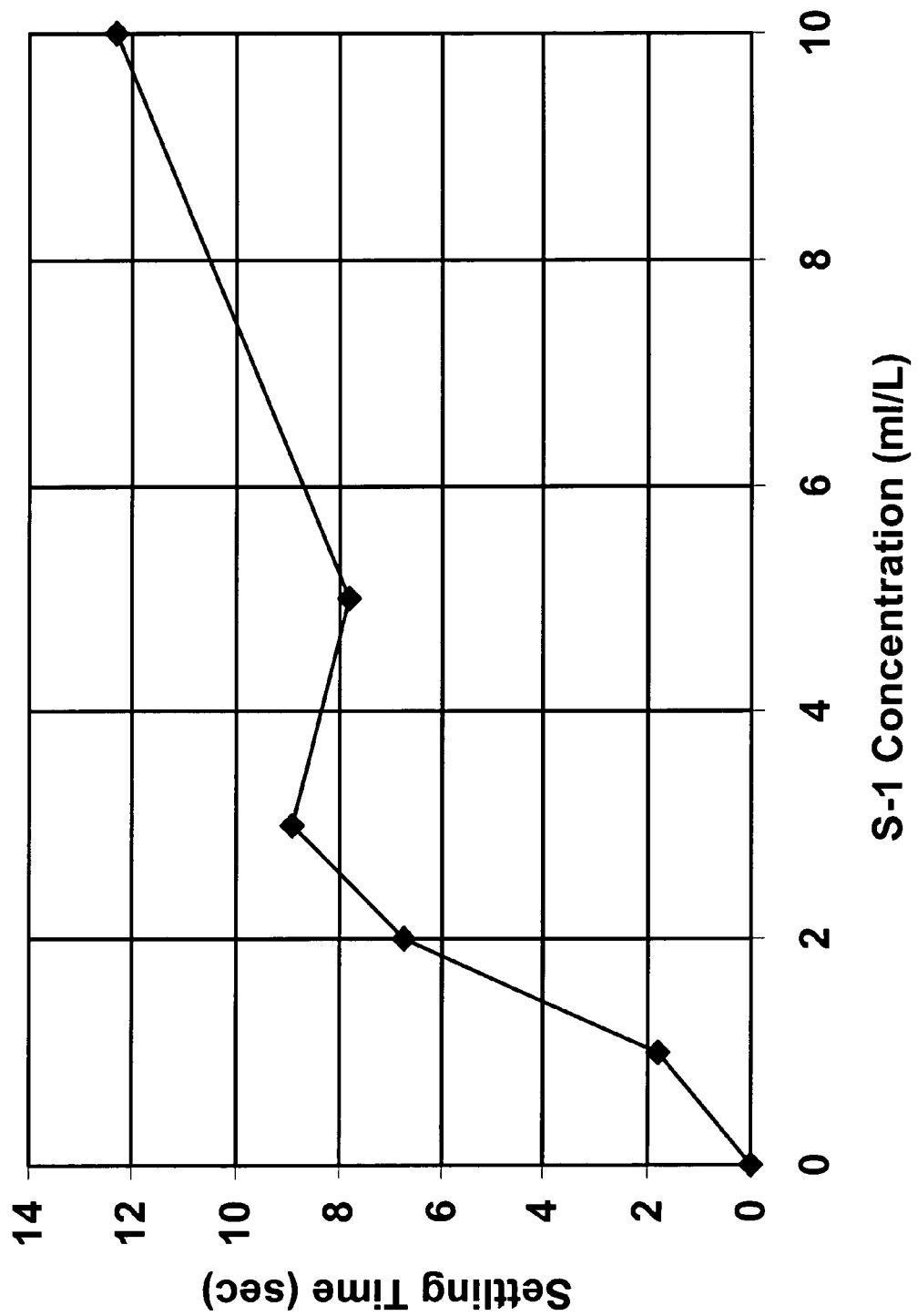
FIG. 22 shows single particle settling times as a function of surfactant concentration for an exemplary gelled oil of the invention at room temperature.

A single particle settling study was performed. In this experiment a large marble ball was dropped into the fluid in a measuring cylinder and the time to fall was determined. The ball had a weight of 5.75 grams and a diameter of 1.55 cm; the cylinder had an inside diameter of about 4 cm. A fall time of about 10 minutes in this experiment is equivalent to a settling time of several hours for sand. With GO fluids, the call settled in less than a second, while for V-GO fluids containing 5 ml/L PH-1, 1.2 ml/L AL-1 and varying amounts of S-1 the settling time was increased to about 8 to 12 seconds, as shown in FIG. 22.

The settling time was further increased by further increasing the PH-1 and AL-1 concentrations. For 8 ml/L PH-1, 2.4 ml/L AL-1 and 10 ml/L S-1 the settling time of the same marble ball was 17.5 minutes. This is a higher settling time than needed for any normal oilfield application.

The invention claimed is:
1. A viscoelastic gelled fluid comprising a non-aqueous base oil, a gelling agent comprising an organic phosphate, an activator, and a gel-enhancing viscoelastic surfactant that increases the viscosity of the fluid in a concentration range of from 0.02 to 1.6 volume percent, wherein the gel-enhancing surfactant comprises a quaternary amine having the formula:

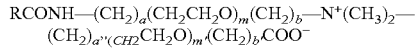
$RCONH-(CH_2)_a(CH_2CH_2O)_m(CH_2)_b-N^+(CH_3)_2-(CH_2)_{a'}(CH_2CH_2O)_{m'}(CH_2)_{b'}COO^-$ in which R is an alkyl group that contains from about 17 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to 10 if m is 0; a' and b' are each 1 or 2 when m' is not 0 and (a'+b') is from 1 to 5 if m is 0; (m+m') is from 0 to 14; and $CH_2CH_2O$ may also be $OCH_2CH_2$.

2. The composition of claim 1 wherein the activator comprises a compound selected from a metal sulfate and a metal carboxylate.

3. The composition of claim 2 wherein the metal carboxylate comprises an aluminum carboxylate.

4. The composition of claim 1 wherein the gel-enhancing surfactant comprises a betaine.

5. The composition of claim 4 wherein the betaine is selected from the group consisting of erucylamidopropyl betaine, oleylamidopropyl betaine, and mixtures thereof.

6. The composition of claim 1 further comprising an alcohol.

7. The composition of claim 6 wherein the alcohol is methanol.

8. The composition of claim 1 further comprising an acid.

9. The composition of claim 8 wherein the acid is an emulsified acid.

10. The composition of claim 1 wherein the non-aqueous base oil is selected from the group consisting of diesel oil, kerosene, paraffinic oil, ether, crude oil, condensate, toluene, xylene, and mineral oil, biodiesel, limonene and mixtures thereof.

11. The composition of claim 1 wherein the organic phosphate comprises a phosphate ester.

12. The composition of claim 1 further comprising a breaker.

13. The composition of claim 1 further wherein the gelled fluid is foamed.

* * * * *